United States Patent
Spratt et al.

(10) Patent No.: US 9,864,212 B2
(45) Date of Patent: Jan. 9, 2018

(54) METHOD FOR REDUCING THE THICKNESS OF A LENS SHAPE AND UNCUT LENS BLANK

(71) Applicants: Carl Zeiss Vision International GmbH, Aalen (DE); Carl Zeiss Vision Inc., San Diego, CA (US)

(72) Inventors: Ray Steven Spratt, Petaluma, CA (US); Timo Kratzer, Aalen (DE); Philipp Ellinger, Hallet Cove (AU)

(73) Assignees: Carl Zeiss Vision International GmbH, Aalen (DE); Carl Zeiss Vision Inc., San Diego, CA (US)

( * ) Notice: Subject to any disclaimer, the term of this patent is extended or adjusted under 35 U.S.C. 154(b) by 0 days.

(21) Appl. No.: 14/719,039

(22) Filed: May 21, 2015

(65) Prior Publication Data

US 2015/0338680 A1  Nov. 26, 2015

Related U.S. Application Data

(63) Continuation of application No. PCT/US2014/039185, filed on May 22, 2014.

(51) Int. Cl.
  *G02C 7/02* (2006.01)

(52) U.S. Cl.
  CPC ............ *G02C 7/027* (2013.01); *G02C 7/024* (2013.01); *G02C 7/028* (2013.01); *G02C 2202/08* (2013.01); *G02C 2202/22* (2013.01)

(58) Field of Classification Search
  CPC ........ G02C 7/024; G02C 7/025; G02C 7/027; G02C 7/028; G02C 2202/08; G02C 2202/22

USPC ............ 351/159.74, 159.75, 159.76, 159.77
See application file for complete search history.

(56) References Cited

U.S. PATENT DOCUMENTS

| | | | |
|---|---|---|---|
| 4,861,153 A | 8/1989 | Winthrop | |
| 6,956,682 B2 | 10/2005 | Wooley | |
| 7,784,937 B2 * | 8/2010 | Keane | G02C 7/022 |
| | | | 351/159.01 |
| 7,857,451 B2 | 12/2010 | Thibos et al. | |
| 8,118,425 B2 | 2/2012 | Esser et al. | |

(Continued)

FOREIGN PATENT DOCUMENTS

| | | |
|---|---|---|
| JP | 2005-242346 A | 9/2005 |
| WO | 03/092485 A1 | 11/2003 |
| WO | 2014/060552 A1 | 4/2014 |

OTHER PUBLICATIONS

Translation and Office action of the Japanese Patent Office dated Jun. 23, 2016 in corresponding Japanese patent application 2015-102007.

(Continued)

*Primary Examiner* — Jordan Schwartz
(74) *Attorney, Agent, or Firm* — Walter Ottesen, P.A.

(57) ABSTRACT

The current invention is directed to a method, in particular a computer-implemented method, for providing a modified lens design for an uncut lens blank, in particular through the use of a non-transitory computer readable medium. Further, a method, in particular a computer-implemented method, for reducing a thickness of an original lens design of an uncut lens blank, in particular through the use of a non-transitory computer readable medium, is provided. Furthermore, a method for manufacturing an uncut lens blank and an uncut lens blank are provided.

16 Claims, 19 Drawing Sheets

(56) References Cited

U.S. PATENT DOCUMENTS

| | | | |
|---|---|---|---|
| 8,205,987 B2 | 6/2012 | Meister et al. | |
| 9,176,329 B2 | 11/2015 | Kelch | |
| 9,434,043 B2 | 9/2016 | Duersteler Lopez et al. | |
| 2005/0110946 A1 | 5/2005 | Youssefi et al. | |
| 2008/0100800 A1 | 5/2008 | Guillen et al. | |
| 2008/0231800 A1 | 9/2008 | Esser et al. | |
| 2009/0015787 A1 | 1/2009 | Guillen et al. | |
| 2009/0244480 A1 | 10/2009 | De Gaudemaris et al. | |
| 2011/0157548 A1* | 6/2011 | Lesage | A61F 2/1613 351/159.2 |
| 2012/0013846 A1* | 1/2012 | Dursteler Lopez | B24B 9/14 351/159.76 |
| 2012/0069297 A1 | 3/2012 | Cabeza et al. | |
| 2015/0253586 A1* | 9/2015 | Amir | G02C 7/024 351/159.42 |

OTHER PUBLICATIONS

Extended Search Report of the European Patent Office dated Sep. 23, 2015 in corresponding European patent application 15168335.6-1562.

Brooks, C. W. et al, "System for ophthalmic dispensing", ISBN-13: 978-0-7506-7480-5, Third Edition, Butterworth-Heineman / Elsevier, 2007, in particular pp. 425 to 429.

Gross, H. et al, "Handbook of Optical Systems", vol. 1 to 5, Wiley-VCH Publishing, Wein-heim, 2007, ISBN: 978-3-527-40382-0, in particular in vol. 3—Aberration Theory and Correction of Optical Systems, in particular its chapters 32 "Principles of Optimization", 33 "Optimization process" and 34 "Special Correction Features" pp. 298 to 593.

Shannon, R.R., "The Art and Science of Optical Design", Cambridge University Press, 1997, ISBN 0-521-58868-5, in particular its chapter 5 "Design optimization", pp. 334 to 355.

DIN EN ISO 13666: Nov. 1998 of the DIN Deutschen Institut fuer Normung, e.V., pp. 1 to 51.

Written Opinion and International Search Report dated Feb. 4, 2015 in international patent application PCT/US2014/039185 on which this application is based.

International preliminary report on patentability and written opinion of the international searching authority dated Dec. 1, 2016 in international patent application PCT/US2014/039185 on which this application is based.

Translation and First Office action with Search Report of the Chinese Patent Office dated Apr. 10, 2017 in corresponding Chinese patent application 201510502136.7.

Examination Report of the Canadian Intellectual Property Office dated Apr. 10, 2017 in corresponding Canadian patent application 2,891,988.

* cited by examiner

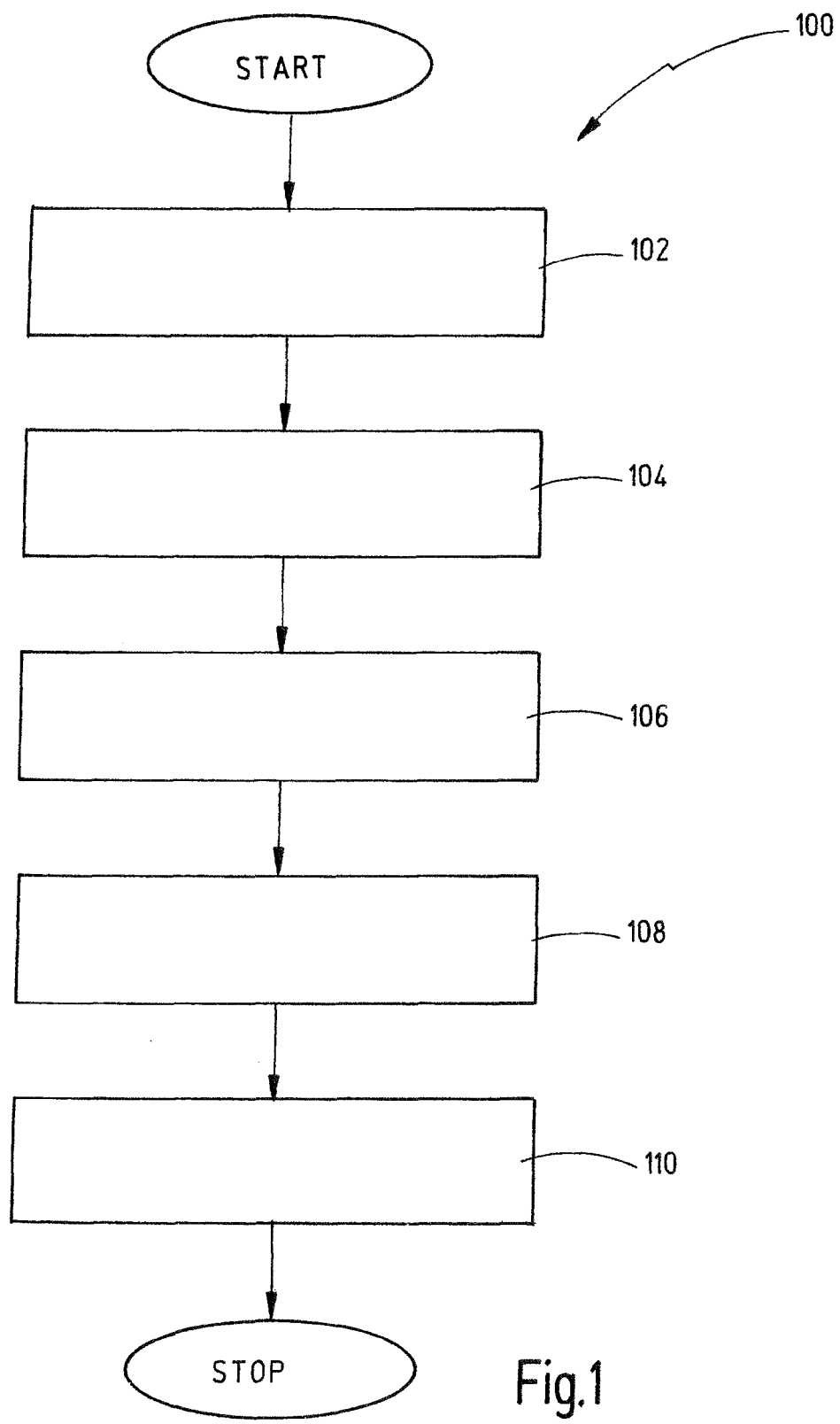

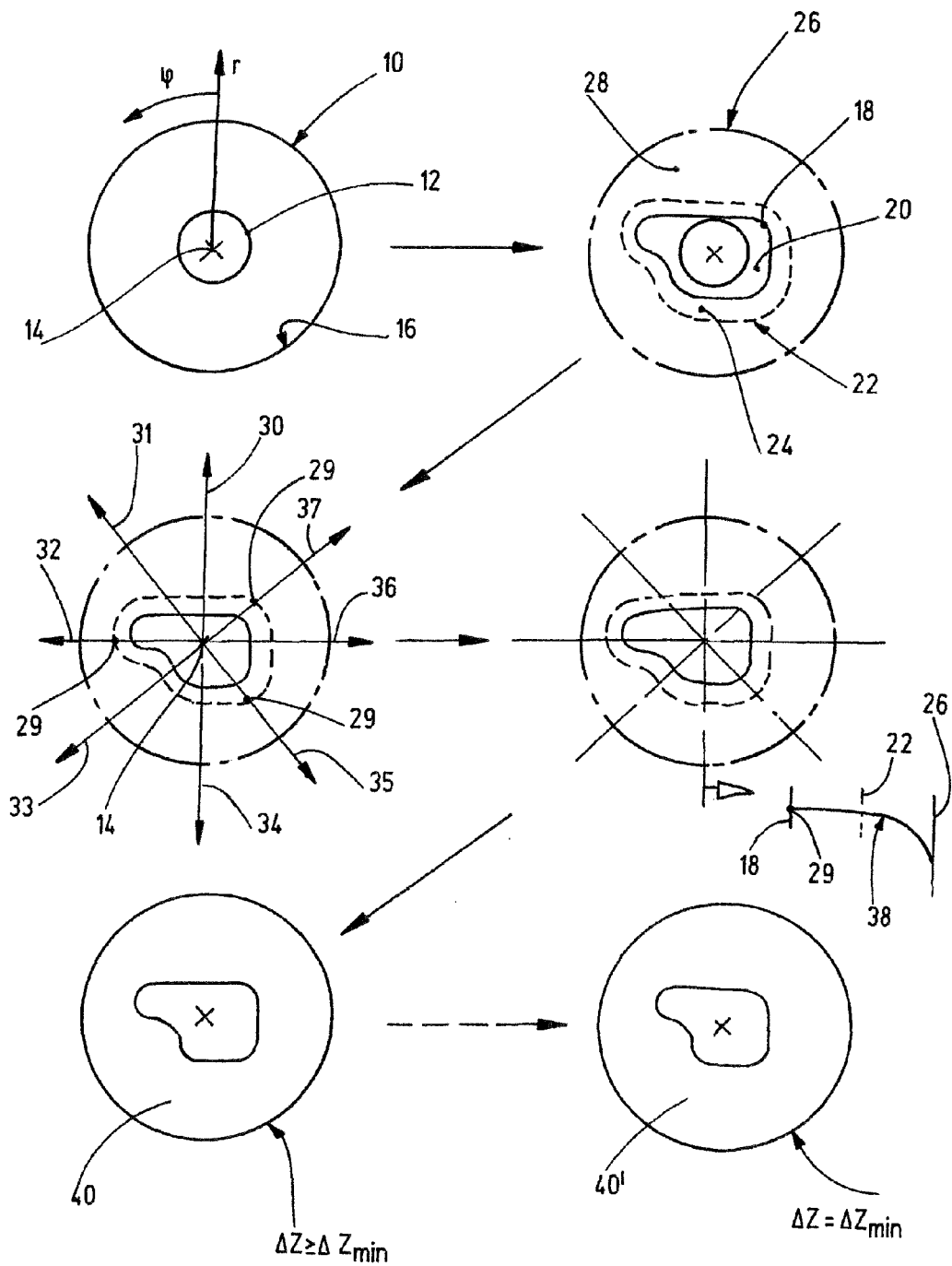

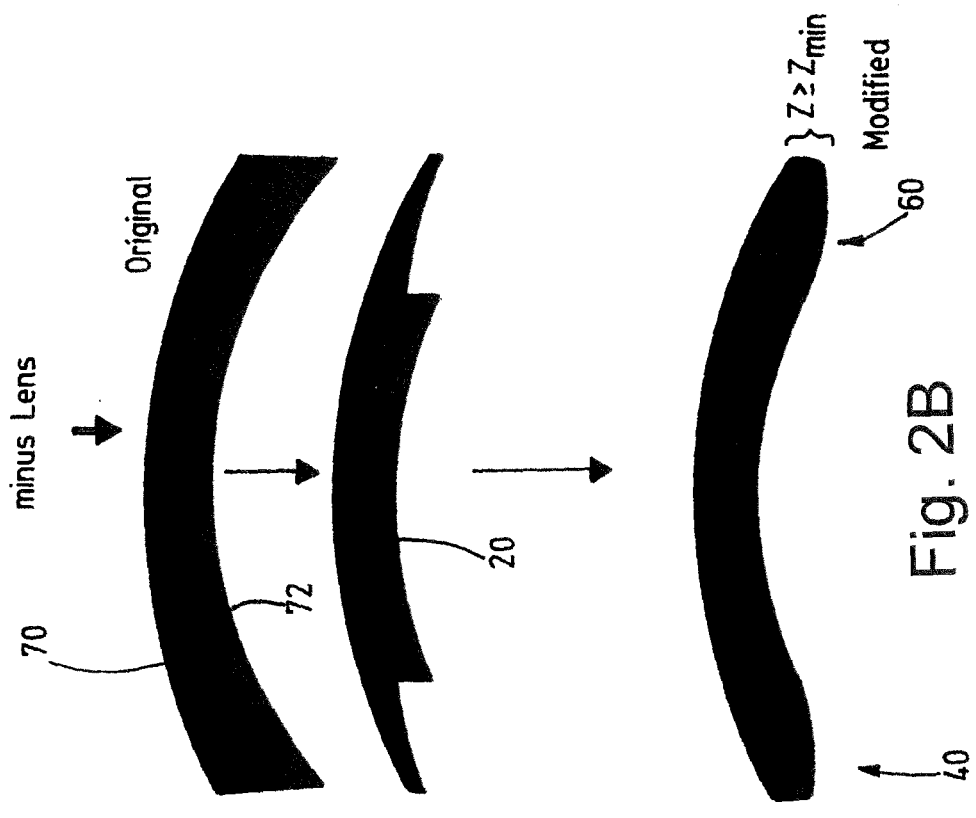
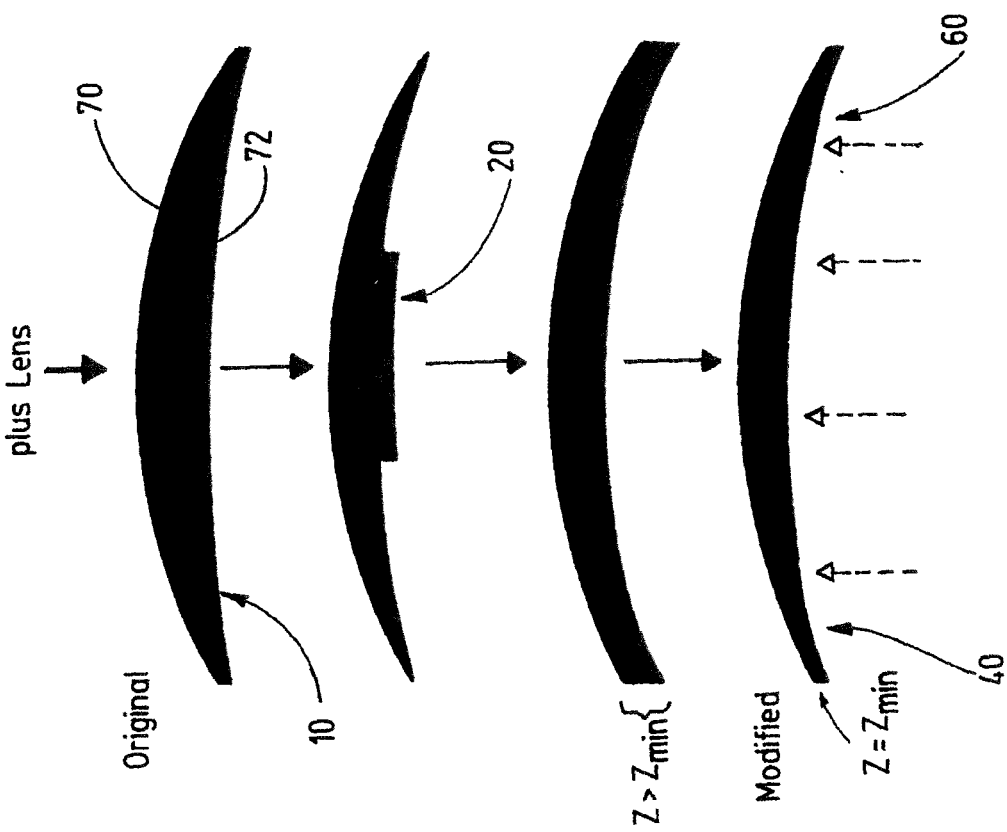
Fig. 2B

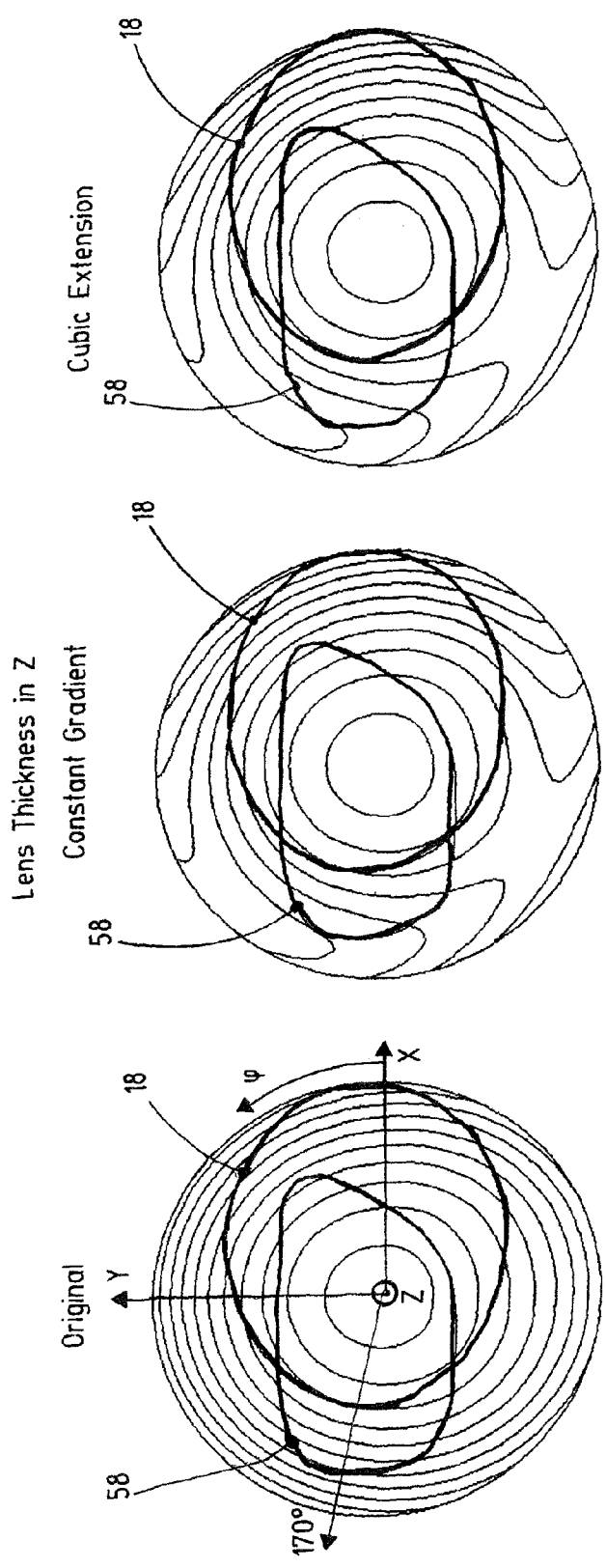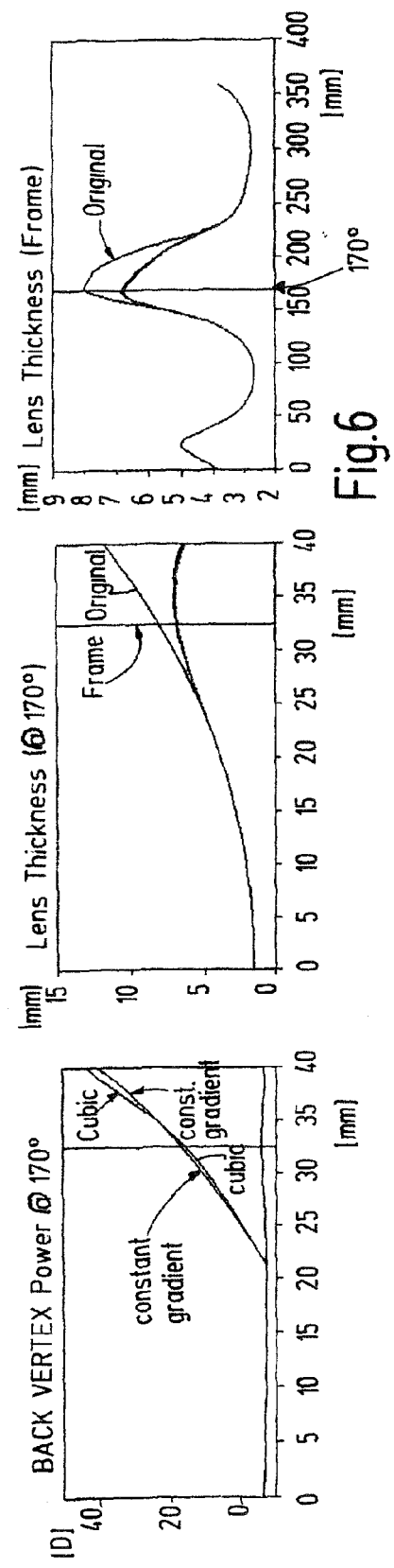
Fig. 6

METHOD FOR REDUCING THE THICKNESS OF A LENS SHAPE AND UNCUT LENS BLANK

CROSS-REFERENCE TO RELATED APPLICATIONS

This application claims the priority of International patent application PCT/US2014/039185, filed May 22, 2014.

BACKGROUND OF THE INVENTION

The current invention is directed towards a method for providing a modified lens shape for an uncut lens blank, in particular for reducing the thickness of the uncut lens shape. Further, the current invention is directed towards an uncut lens blank for manufacturing a spectacle lens.

In recent years, the number of so-called individually designed spectacle lenses has been significantly increasing. These individually designed spectacle lenses take into account a number of individual parameters of an intended wearer. Further, the demand for a correction not only of lower-order aberrations but also for higher-order aberrations is steadily increasing. This all leads towards more and more lenses being designed with "free form surfaces", that is, surfaces that do not inhibit any symmetry any more. A full surface profile is determined, for example by providing sagitta for each surface over the whole area, and forwarded to a manufacturing site, for example for grinding, polishing, coating and/or edging. Commercially available wavefront sensors provide the ability and data processing techniques for correcting the high-order aberrations of the eye with an ophthalmic lens without introducing more significant low-order wavefront aberrations; and to the ability of machining ophthalmic lens surfaces of suitable complexity, in particular with modern free-form surfacing techniques.

Prior to edging, that is, cutting the lens blank to its final shape to fit into a frame, the lenses are processed as so-called "uncut lens blanks", that is, lens blanks having a circular or elliptical shape and a front surface having a convex curvature providing for a specific focal power already applied to it. Further, the front surface may already be coated. The intended optical properties are then provided by surfacing the back surface with a predetermined free-form surface. At least for the surfacing steps, that is, grinding and polishing, and for the step coating, the uncut lens blank has to be blocked by corresponding block pieces that can grip the uncut lens blanks securely while leaving open the surfaces to be processed. Further, the tools and methods used for surfacing inherit certain constraints on the shape of surfaces that can actually be processed. Last, wearers prefer lightweight spectacles and certain aesthetically advantageous frame shapes can fix lenses up to a certain outer edge thickness only.

In the prior art, the problems associated with large lens thicknesses have already been known, in particular for lenses having a very high positive or negative focal power. For these purposes, lenticular lenses have been provided which comprise a lenticular portion providing for desired optical properties, in particular according to a prescription, and a relatively thin margin portion outside of a specific viewing angle for manufacturing and framing purposes. Examples for such lenticular lenses are provided, for example, in "System for ophthalmic dispensing" by Clifford W. Brooks and Irvin M. Borish, ISBN-13: 978-0-7506-7480-5, Third Edition, Butterworth-Heineman/Elsevier, 2007, in particular pages 425 to 429.

Turning to free-form surfaces and corresponding spectacle lenses, the basic problem is still to modify the thickness profile of an ophthalmic lens by modifying one of the surfaces outside of some specified boundary. The traditional and "ideal" method in terms of maximizing the size of the optical zone while minimizing the center thickness of plus lenses or edge thickness of minus lenses, and also minimizing wearer discomfort when the boundary between the lenticular portion and the margin portion lies within the frame, requires that the modified surface has a slope discontinuity along the boundary.

The traditional methods are not well suited to the current back surface freeform technology. The positive powered lenses require specialized pucks with complex front surfaces, which would increase the complexity and the required inventory for freeform processing. The minus lenses require the back to be surfaced and polished twice, adding to the processing time and cost. In addition methods and surfaces are perceived as "higher tech" and are aesthetically preferred.

WO 2014/060552 A1 shows a method for determining a surface of an ophthalmic lens comprising a carrier and a Fresnel membrane lying on the carrier. The invention also relates to an ophthalmic lens comprising such a surface. The invention especially relates to a method for determining a surface of an ophthalmic lens, where the surface comprises a Fresnel membrane and a carrier supporting the Fresnel membrane. The carrier has a geometric center, a first central region and an annular peripheral region, and a rotational symmetry. The Fresnel membrane, the first central region and the peripheral region are centered on the geometric center, the first central region being defined by a first circular border, and the peripheral region being defined by a second circular border and by the edge of the surface. The method comprises steps of: (SI) determining a first curvature profile of the carrier in the first central region and a second curvature profile of the carrier in the peripheral region; (S10) determining a first radius of the first border and a second radius of the second border; (S20) determining a third curvature profile of a transition region of the carrier, where the transition region is adjacent to the first central region and to the peripheral region; (S30) determining a target curvature profile of the surface where the target curvature profile is identical in the first central region to the first curvature profile of the carrier; (S40) determining a continuous curvature profile for the Fresnel membrane from a difference between the target curvature profile and the curvature profile of the carrier; and (S50) determining the Fresnel membrane by cutting the continuous curvature profile for the Fresnel membrane.

Hence, it is an object of the current invention to provide for a method for reducing the thickness of an uncut lens blank, in particular having a spherical front surface and an arbitrary free-form back surface shape, and a corresponding uncut lens blank.

BRIEF SUMMARY OF THE INVENTION

According to a first aspect of the invention, there is provided a method, in particular a computer-implemented method, for providing a modified lens shape for an uncut lens blank, in particular through the use of a non-transitory computer readable medium, comprising the following steps:

a) providing an original lens shape of an uncut lens blank having a front surface and a back surface, wherein the original lens shape comprises an original shape of a front surface and an original shape of the back surface of the uncut lens blank such that the uncut lens blank satisfies predetermined optical properties, in particular a prescription, and in particular providing a predefined curvature value;

b) determining a boundary line, in particular wherein a curvature profile of the original shape of the back surface is to be preserved within the boundary line;

c) determining a boundary curvature of the back surface at the boundary line;

d) determining a new curvature profile of the back surface between the boundary line and an outer edge of the uncut lens blank, wherein the curvature of the new curvature profile equals the boundary curvature at the boundary line and transitions monotonically and continuously towards the outer edge from the boundary curvature towards a predefined curvature value or a predefined curvature;

e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the, in particular preserved, curvature profile of the original lens shape within the boundary line and a thickness requirement for the outer edge of the uncut lens blank, in particular wherein the curvature profile of the original lens design is preserved or fixed within the boundary line.

In particular, in the method according to the first aspect, the predefined curvature value is a radial curvature of the back surface or a curvature within a meridian plane of the front surface, in particular and wherein the transition of the new curvature profile is determined within a meridian plane of the front surface In particular, in the method according to the first aspect, a predefined minimum thickness of the outer edge of the uncut lens blank is applied as a mandatory condition during optimization In general, the predefined curvature may be an extreme curvature of the back surface, in particular a maximum curvature or a minimum curvature.

In particular, steps d) and e) can be conducted subsequently, that is, step e) after step d), or in parallel.

In particular, the method further comprises providing an extreme curvature value of the back surface, in particular a maximum curvature or a minimum curvature, as the predetermined curvature value. In particular, step b) comprises determining a boundary line on the back surface, in particular wherein a curvature profile of the original shape of the back surface is to be preserved within the boundary line. In particular, step c) comprises determining a carrier point on the back surface and at least one straight carrier line on the back surface, wherein each straight carrier line emanates from the carrier point, and, for each straight carrier line, determining a boundary curvature of the back surface at an intersection point of the respective straight carrier line and the boundary line. In particular, step d) comprises determining, for each straight carrier line, a new curvature profile of the back surface along the respective carrier line from the intersection point to an outer edge of the uncut lens blank, wherein the curvature of the new curvature profile equals the boundary curvature at the intersection point and transitions monotonically from the boundary curvature to the extreme curvature value towards the outer edge. In particular, the modified shape of the back surface is determined by an optimization towards a target shape, wherein the target shape includes the curvature profile of the original lens shape of the back surface within the boundary line which curvature profile is fixed during the optimization, the curvature profile of each straight carrier line outside the boundary line which curvature profile is fixed during the optimization, and the extreme curvature value for the back surface outside the boundary line, and wherein the optimization applies the condition that a curvature of the back surface along the boundary line is continuous.

The basic idea of the invention is to modify the shape of the original back surface. It is basically a two stage modification of the power of the back surface along specific lines, in particular, the tangential or radial power, beyond some specified boundary, and then recalculating the surface having the newly specified tangential or radial curvature. By the specified method, it is possible to apply this thickness reduction to any original lens shape, in particular any arbitrary free form surface profile on the back surface.

The idea is to reduce the thickness of the lens by increasing the curvature of the back surface as rapidly as possible radially outwards of a preserved area, given the constraints of the surfacing processes, in particular grinding, polishing and cutting or edging. "Increasing" the curvature here means that its magnitude takes on an extreme value as quickly as possible. For plus lenses having a positive focal power, the curvature shall indeed take on a maximum positive value as quickly as possible. For minus lenses having a negative focal power, the curvature shall take on a minimum value which may be positive or even negative. The description "as quickly as possible" here means that the transition towards the extreme value considers limiting constraints of the manufacturing tools and disturbance caused to a wearer. However, any kinks on the back surface are to be avoided. A smooth curvature profile is the target which provides for an aesthetically preferred and optically less disturbing appearance. As no sudden changes in optical power over the viewing angle can occur, it can be assumed that wearers would certainly prefer smooth back surface shapes. Further, constraints inherited by the manufacturing processes can be taken into account. As the new curvature profiles are generally determined before the optimization process and the determination of the full description of the complete back surface, constraints for the extension of a transition zone from a curvature of the optically preserved surface area within the boundary line towards the extreme curvature value can be specified as well as minimum thicknesses required for certain blocking tools could be defined. This all ensures that a modified lens design for the uncut lens blank is provided that has a reduced thickness, that may further lead to a reduced thickness of the final lens element. Even further, it is ensured that the uncut lens blank can be ground, polished, coated and edged with available processing tools.

In general, a point on the back surface of the uncut lens blank is located. Preferably, the point is inside the eventual frame, more preferably a point is at the geometrical center of the uncut lens blank or "puck". For any direction, the curvature of the original back surface is determined at a specified boundary radius along a straight line emanating from that point. This specified inner boundary radius or "boundary line" is a function $r(\varphi)$. It may take any shape and specifies a surface area of the original back surface in which the curvature profile is to be preserved. In other words, the profile of the sagittal height is preserved, but only in a relative manner so that the optical properties of the preserved surface area remain essentially the same. The absolute position in the z-direction or the absolute sagittal height however may be adjusted during the method in case of plus lenses, or lenses having a positive focal power, as will be explained later on.

Along each straight line, a curvature function is then created that transitions monotonically from the curvature of the preserved surface area at that specified boundary line to a different curvature, namely the extreme curvature value, at some radius further out, that is, towards the outer edge of the uncut lens blank. Then, that curvature or extreme curvature value is essentially maintained towards the end of the uncut lens blank, that is, the outer edge of the uncut lens blank. Hence, outside the boundary line, a surface area of a curvature transition or transition portion exists in which the curvature transitions towards the extreme value and which transition portion encompasses the inner preserved surface area within the boundary line. However, depending on the position of the boundary line, no complete encompassing is necessary. In case the boundary line should start and end on the outer edge of the uncut lens blank so that the preserved surface area is "open" towards the outside, the transition portion, of course, can only encompass the inner preserved surface area along the boundary line actually present. Further outside, the curvature along each straight line at a given angle φ shall remain constant towardsthe outside. In general, the inner radius or the radius of the boundary line may be less than, equal to or greater than the radius of the frame along that specific angle. In general, the angle φ is, as usual, to be measured within the X-Y-plane of the design coordinate system.

In such a coordinate system, the X-Y-plane can be defined as running parallel to a tangent plane of the point on the front surface with zero curvature. In a section plane of the modified surface and along each straight carrier line, the new surface is then constructed by extending the original surface profile within the boundary line by integrating the new curvature profile beyond the inner specified radius of the boundary line towards the outer edge. As already stated above, in general, the radii of the inner boundary and the end of the transition zone, and the modified curvature can be functions of the angle φ.

In document WO 2014/060552 A1, merely a difference between the target profile and the profile determined in steps (SI) to (S20) is determined in step S40. This difference is designated as a continuous curved profile which then is used as the basis to cut an additional Fresnel sheet to be applied to the carrier. But, there does not seem to be an optimization procedure to find the modified shape based on the new curvature profile, with the optimization towards a target shape and wherein also a thickness requirement for the outer edge of the uncut lens blank is applied.

According to a second aspect of the invention, there is provided a method, in particular a computer-implemented method, for reducing a thickness of an original lens shape of an uncut lens blank, in particular through the use of a non-transitory computer readable medium, comprising the following steps:
A) providing an original lens shape of an uncut lens blank, wherein the original lens shape comprises an original shape of a front surface and a back surface of the uncut lens blank, such that the uncut lens blank satisfies predetermined optical properties, in particular according to a prescription;
B) specifying a set of parameters including a recommended maximum magnitude of a curvature gradient of the back surface, a hard-limit maximum magnitude of a curvature gradient of the back surface which is larger than the recommended maximum magnitude, a recommended extreme curvature value, a minimum value for an eye rotation angle, a recommended value for the eye rotation angle, a frame line on the back surface along which a final lens is to be cut out of the uncut lens blank, a maximum lens thickness along the frame line, and a boundary line, in particular within which the original shape of the back surface is to be preserved;
C) iteratively conducting the method for providing a modified lens shape according to the first aspect or one of its refinements based on the set of parameters, to provide for a modified lens shape until a lens thickness along the frame line of the modified lens shape is equal or below the specified maximum lens thickness, and wherein, during iteration, at least one of the maximum magnitude curvature gradient of the back surface, the boundary line and the predefined curvature value is modified.

In particular, during the iteration in step C), the set of parameters may be modified according the following sequence:
I. applying the recommended maximum magnitude of the curvature gradient and the recommended predefined curvature value, and decreasing the boundary line from an initial shape being at least partly identical to the frame line towards a shape enclosing a back surface area covering at least the recommended eye rotation angle,
II. increasing the magnitude of the maximum curvature gradient from the recommended maximum magnitude towards the hard-limit maximum magnitude;
III. decreasing the boundary line from a shape enclosing the back surface area covering at least the recommended eye rotation angle towards a shape enclosing a back surface area covering at least the minimum eye rotation angle.

This method ensures that a thickness of the final edged lens along its outside, that is, the frame line, is not larger than a specified maximum lens thickness along the frame line. This can be advantageous in case the lens is intended to fit into a certain frame that can only hold lenses up to a specific lens thickness. There are three main parameters that control the reduction in edge thickness according to the proposed methods. These parameters are the curvature gradient of the back surface, the extreme curvature value allowed for the back surface which extreme curvature value is a maximum for an inverse lentic for plus lenses and a minimum for a carrier curve for minus lenses, and the minimum eye rotation angle to be represented by the boundary line, that is, the minimum eye rotation angle that shall be covered by the surface area of the back surface within the boundary line. Then, to satisfy the specified edge thickness request, at first the recommended curvature gradient is set as well as the extreme value for the curvature of the back surface. Then, the size of the surface area within the boundary line is reduced, for example by keeping the general shape of the boundary line by scaling it with a factor below one. By this, the boundary size can be reduced from an initial size to the recommended boundary size. For example, the initial size may be a size that extends up to the frame line over at least a part of the boundary line. If this reduction should not be sufficient, the maximum allowed curvature gradient can be increased from the recommended value to a maximum value. If this should still not be sufficient, the size of the surface area encompassed by the boundary line can be further reduced to cover not the recommended eye rotation angle but only the minimum eye rotation angle. Last, if this still should not be sufficient, an even more extreme curvature value could be chosen up to a preset hard limit.

According to a third aspect of the invention, there is provided a method for manufacturing a lens, comprising the steps of providing a modified lens shape for an uncut lens blank according to a method according to the first aspect or of its refinements or according to the second aspect or one of its refinements, and manufacturing the uncut lens blank according to the modified lens shape.

Such a method for manufacturing finally enables the manufacturing of an uncut spectacle lens according to the modified lens shape. Such an uncut lens blank provides for the advantages of a reduced thickness that will be maintained over edging and further reduce the thickness of the then edged final lens. Furthermore, it is ensured that the uncut lens blank can be processed by the surfacing and edging machinery as sufficient constraints for the back surface, in particular maximum curvature gradient, extreme curvature value and thickness of the outer edge of the uncut lens blank, were set and corresponding minimum requirements are thus fulfilled for sure. The manufacturing could then be conducted as usual. This means that the surfaces will be ground, polished and, if needed, coated. Further, edging may occur which can generally be conducted prior or subsequent to coating.

According to a fourth aspect of the invention, there is provided an uncut lens blank for manufacturing a spectacle lens, comprising a front surface and a back surface, wherein the front surface is a rotationally symmetric surface, and wherein the back surface comprises a lenticular portion, a margin portion and a transition portion located between the lenticular portion and the margin portion, and wherein a curvature of the back surface along a straight line emanating from a point on the back surface takes an extreme curvature value over the complete margin portion and transitions monotonically towards the extreme curvature value through the transition portion, in particular wherein the curvature of the back surface along the straight line is continuous.

In particular, the curvature of the back surface along the straight line emanating from the point on the back surface transitions monotonically with a curvature gradient different from zero towards the extreme curvature value. In particular, the lenticular portion has a surface profile that is asymmetric, in particular which surface profile is a free-form surface profile. In particular, the front surface has a curvature different from zero. In particular, the front surface is a convex surface. In particular, the front surface may be a spherical surface. In particular, the front surface may be an aspherical and rotationally symmetric surface.

In particular, the uncut lens blank is a unitary element consisting of a single material. Therefore, the uncut lens blank may have a unitary refractive index and/or Abbe number at a specific wavelength.

In particular, a curvature of the back surface is continuous. In particular, a curvature of the back surface along the straight line is continuous. In particular, a curvature of the back surface along the boundary line is continuous. In particular, a curvature of the back surface outside the boundary line equals a curvature of the fixed curvature profile of the original lens shape within the boundary line along the boundary line.

Hence, the uncut lens blank provides the same advantages as provided by the method according to the third aspect. It is a direct result of the corresponding manufacturing process. The front surface is a spherical surface having a non-zero curvature. Usually, the front surface is a convex surface having positive curvature. The back surface comprises a lenticular portion. The term "lenticular portion" has been chosen as this is the portion with the optically preserved surface profile according to the original lens shape. It is the portion of the back surface covering an intended minimum eye rotation angle so that the wearer looks through it. Hence, this lenticular portion is surrounded by the boundary line according to the methods according to the first and second aspects. The lenticular portion may extend to the outer edge of the uncut lens blank. Hence, it may not be fully surrounded by the boundary line but be "open" towards the outside. Preferably, that lenticular portion comprises the geometrical center of the uncut lens blank on the back surface. In the lenticular portion, the surface profile of the back surface is a free form surface profile. This means, it has no symmetry, neither a rotational symmetry nor a plane symmetry nor a point symmetry. The point can be specified on the back surface, preferably the point in the geometrical center of the uncut lens blank. Straight lines can be considered emanating from that point. Herein "straight" means they run in a constant angle around a line which is normal to the center of curvature of the front surface. Hence, for example in case the point is the geometrical center of the uncut lens blank, each line runs in a meridian of the front surface. Along each line, the curvature of the back surface transitions monotonically from the margin portion towards a predefined curvature value, in particular extreme curvature value, towards the outer edge of the uncut lens blank. This transition from the curvature at the end of the lenticular portion towards the predefined curvature value, in particular extreme curvature value, is conducted in a transition portion that, hence, is positioned between the margin portion and the lenticular portion. Over the margin portion, the predefined curvature value, in particular extreme curvature value, is present. Hence, in case the point is the geometrical center of the uncut lens blank, the tangential or radial curvature over the whole margin portion is the same. Herein "the same" means that it is essentially the same given the usual manufacturing tolerances and optimization necessities of optical design.

In general, even not knowing the location of the point, it would be possible to choose a multitude of points within the margin region, that is, the part of the back surface that is not a free-form surface, calculating curvatures in any direction in this multitude of points and then comparing in which directions from these points the curvatures are the very same. Drawing straight lines in these directions of identical curvature, this would lead to the lines intersecting in a single point which is then the point according to the definition.

According to a fifth aspect of the invention, there is provided a, in particular non-transitory, computer program product comprising program code means for carrying out the steps of a method according to the first aspect or one of its refinements.

According to a sixth aspect of the invention, there is provided a, in particular non-transitory, computer program product comprising program code means for carrying out the steps of a method according to the second aspect or one of its refinements.

According to a seventh aspect of the invention, there is provided an uncut lens blank manufactured according to the method according to the third aspect of the invention.

According to an eighth aspect of the invention, there is provided a computer system for providing a modified lens shape, comprising means for providing an original lens shape of an uncut lens blank having a front surface and a back surface, wherein the original lens shape comprises an original shape of a front surface and an original shape of the back surface of the uncut lens blank such that the uncut lens blank satisfies predetermined optical properties, in particular a prescription, and in particular providing a predefined curvature value; means for determining a boundary line, in particular wherein a curvature profile of the original shape of the back surface is to be preserved within the boundary line; means for determining a boundary curvature of the back surface at the boundary line; means for determining a new curvature profile of the back surface between the boundary line and an outer edge of the uncut lens blank, wherein the curvature of the new curvature profile equals the boundary curvature at the boundary line and transitions monotonically and continuously towards the outer edge from the boundary curvature towards a predefined curvature value or a predefined curvature; and means for determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the, in particular preserved, curvature profile of the original lens shape within the boundary line and a thickness requirement for the outer edge of the uncut lens blank, in particular wherein the curvature profile of the original lens design is preserved or fixed within the boundary line. Further, the computer system may comprise means for step A) of the second aspect, means for step B) according to the second aspect and means for step C) according to the third aspect.

According to a ninth aspect of the invention there is provided an uncut lens blank for manufacturing a spectacle lens, comprising a front surface and a back surface, wherein the front surface is a convex rotationally symmetric surface, and wherein the back surface comprises a lenticular portion which is asymmetric, a margin portion and a transition portion located between the lenticular portion and the margin portion, and wherein a curvature of the back surface along a straight line emanating from a point on the back surface transitions monotonically towards an extreme curvature value through the transition portion, and wherein the curvature of the back surface along the straight line is continuous.

According to a tenth aspect of the invention, there is provided a, in particular non-transitory, computer program comprising program code means for carrying out the steps of a method according to the first aspect or one of its refinements.

According to an eleventh aspect of the invention, there is provided a, in particular non-transitory, computer program comprising program code means for carrying out the steps of a method according to the second aspect or one of its refinements.

According to a twelfth aspect, there is provided a machine readable storage medium having stored thereon a computer program comprising program code means for carrying out the steps of a method according to the first aspect or one of its refinements. According to a thirteenth aspect, there is provided a machine readable storage medium having stored thereon a computer program comprising program code means for carrying out the steps of a method according to the second aspect or one of its refinements.

In particular, the computer program products according to the fifth and sixth aspects, the computer system according to the eighth aspect, the uncut lens blank according to the seventh and ninth aspects, the computer program according to the tenth and eleventh aspects and the machine readable storage mediums according to the twelfth and thirteenth aspects provide for the same advantages as the methods according to the first to third aspects and the uncut lens blank according to the fourth aspect.

Concerning the general technical background, in ophthalmic lens design, an intended or "target" distribution of wavefront aberrations is typically specified. This distribution generally represents the ideal optical performance of the lens design for a particular combination of eyeglass prescription powers and fitting parameters. A typical optimization process seeks to achieve the desired distribution of optical powers as closely as possible by manipulating one or more continuously smooth surfaces of an ophthalmic lens element. At multiple points across the lens aperture, differences in optical performance between the modeled ophthalmic lens element and the target distribution are assessed using computer ray tracing for an assumed position of wear, which represents the position of the fitted lens on the wearer. During a typical ray tracing procedure, the refraction through the lens element of a quantity of rays from a specified object point, sufficient to characterize the wavefront aberrations of the lens up to the chosen order, are calculated. Ideally, these rays should all converge at the ideal focal plane of the eye associated with the object distance, although this is frequently not mathematically possible at all points across the lens aperture.

Typically, "merit functions" or least-square solutions representing the total magnitude of optical aberrations at these points are minimized at each of the specified points across the lens aperture using mathematical optimization and modeling techniques, such as finite element analysis. Further, these merit functions or the individual terms of these merit functions may also be weighted differently over the lens aperture in order to maximize visual performance in certain regions of the lens, wherein vision quality is most critical, or to minimize optimization in regions of the lens wherein certain optical aberrations are unavoidable due to the nature of the lens design.

Based on this an "original lens shape" of an uncut lens blank is provided. The general details of lens shape and the mathematical basics to find such a shape are known to a person skilled in the art. Further, optimizing a surface profile towards a target shape or based on target parameters and boundary conditions are commonly known to a person skilled in the art. As an example, such details may be derived from "The Art and Science of Optical Design" by R. R. Shannon, Cambridge University Press, 1997, ISBN 0-521-58868-5, in particular its chapter 5 "Design optimization", and even in more detail in "Handbook of Optical Systems", Gross et al., Vol. 1 to 5, WILEY-VCH Publishing, Weinheim, 2007, ISBN: 978-3-527-40382-0", in particular in Volume 3—"Aberration Theory and Correction of Optical Systems, in particular its chapters 32 "Principles of Optimization", 33 "Optimization process" and 34 "Special Correction Features".

Further to this, different kinds of merit functions and optimization metrics to provide results of objective refraction techniques have been contemplated and are well known to a person skilled in the art. Examples are given in document U.S. Pat. No. 7,857,451 B2 "System and method for optimizing clinical optic prescriptions", document US 2012/0069297 A1 "Eyeglass prescription method", US 2005/0110946 A1 "Objective manifest refraction", WO 03/092485 A1 "Sharpness metric for vision quality", US 2008/0100800 A1 "Eyeglass prescription method", US 2009/0015787 A1 "Apparatus and method for determining an eyeglass prescription for a vision defect of an eye" and document U.S. Pat. No. 8,205,987 B2 "Method for optimizing a spectacle lens for the wavefront aberrations of an eye", the disclosure of each of which is incorporated herein by reference and for which features protection may be sought. In case of conflict, the present specification will control.

The term "merit function" is well known for a person skilled in the art. A merit function, also known as a figure-of-merit function, is a function that measures the agreement between an optimum and a fitting model—here the back surface—for a particular choice of the parameters. In other words, the merit function evaluates a choice of parameter by providing a value, that is, the value of the merit function. The merit function may become small when approaching an optimum. For example, the value of the merit function may represent a criterion for vision quality or simply a difference between the determined back surface and a target shape. However, it may also be designed in a way that it becomes large for a better choice of parameters. During optimization, the parameters are adjusted based on the value of the merit function until an optimum value (either largest or smallest value) is obtained, thus producing a best-fit or optimum with the corresponding parameters giving the optimal value of the merit function.

Unless otherwise indicated, the terminology used in the context of the present application corresponds to the definitions in the standard DIN EN ISO 13666: 1998-11 of the DIN Deutschen Institut fur Normung e.V.

Accordingly, a "spectacle lens" refers to an ophthalmic lens which is worn in front of the eye but not in contact with the eye, cf. Chapter 8.1.2 of the standard DIN EN ISO 13666. In the context of the present application, a finished spectacle lens according to No 8.4.6 of standard DIN EN ISO 13666 is also intended to be understood by the term "spectacle lens". Accordingly, this is a spectacle lens having two fully processed optical surfaces. It may be a spectacle lens before or after the edging. In principle, the spectacle lenses are delivered as so-called uncut spectacle lenses, or spectacle lenses finished with raw edges, for example from a large-scale laboratory to dispensing opticians. The uncut spectacle lens generally has a circular or elliptical edge shape. The uncut spectacle lenses are only adapted to a particular frame and brought into the final size and shape by edging on the dispensing optician's premises.

The term "uncut lens blank" according to the current application is intended to mean a lens blank having two surfaces, that is, the front surface and the back surface, which both have their final shape prior to edging. A coating may be applied to none, one or both of the surfaces. Also, the term "uncut lens" is to be understood according to 8.4.7 of the standard DIN EN ISO 13666, but only with the premise that none, one or both of the front and back surfaces may be coated already. However, it may also be referred to as a "lens blank". It may have a circular or elliptical shape. In case of a circular lens blank, the diameter may be at least 60 mm, in particular from 60 mm to and including 80 mm. In case of an elliptical lens blank, the smallest diameter may be at least 60 mm, in particular from 60 mm to and including 80 mm.

The term "optical axis" is intended to mean a straight line which is perpendicular to the two optical surfaces of a spectacle lens and along which light passes through the spectacle lens undeviated, cf. No 4.8 of the standard DIN EN ISO 13666.

A "meridian" or "meridian of a surface" is intended according to 5.7.1 of DIN EN ISO 13666 to mean any plane which contains the center of curvature of such a surface.

In the context of the present invention, a "sectional plane" or "section plane" within which a straight carrier line runs is intended to mean a cross section through the lens, which is parallel to an intended main fixation direction of a user through the spectacle lens. If the lens has an optical axis, the sectional plane may be a meridian plane. If the lens has a surface, in particular the front surface, with a center of curvature, the cross-sectional plane may be a meridian. If a lens does not have an optical axis, the sectional plane may also contain the geometrical center according to No 5.5 of the standard DIN EN ISO 13666, that is, the point of intersection of the horizontal and vertical centerlines of the box, relating to the shape of the uncut lens blank. The sectional plane can also contain the visual point according to No 5.11 of the standard DIN EN ISO 13666, that is, the point of intersection of the line of sight with the back surface of the spectacle lens.

The "line of sight" is in this case intended according to No 5.32 of the standard DIN EN ISO 13666 to mean the line which joins the center of the fovea to the center of the exit pupil of the eye and its continuation from the center of the entrance pupil forward into object space.

In the context of the present application, a "visual point" is in this case intended to mean the point on the back surface of the spectacle lens at which the line of sight intersects the back surface of the spectacle lens, when the eye assumes a relaxed position. This is also referred to as "primary position" according to No 5.31 of the standard DIN EN ISO 13666, that is, a position of the eye relative to the body for the case in which the eyes look straight in a fixation direction at an object which lies at eye level. The position of the fitting point may be placed and readable as a marking in the uncut lens blank.

In the case of decentration according to No 5.23 in the standard DIN EN ISO 13666 of the spectacle lens, the required centration point is different from the geometrical boxed center in the form of the edged spectacle lens, compare No 5.23 for "decentration" with No 5.24 "centration point" in the standard DIN EN ISO 13666. In particular, the cross-sectional plane may then comprise the "fitting point" according to No 5.24 of the standard DIN EN ISO 13666, that is, the point on the front surface of the spectacle lens or of the uncut spectacle lens which, according to the stipulation of the manufacturer, is to be used as a reference point for positioning the lens in front of the eye. The position of the fitting point is generally placed and readable as a marking in the uncut lens blank.

The terms "front surface" and "back surface" in the context of the present application correspond to those of the standard DIN EN ISO 13666. According to No 5.8 of the standard DIN EN ISO 13666, the term "front surface" is intended to mean the surface of the spectacle lens which is intended to face away from the eye in the spectacles. According to No 5.9 of the standard DIN EN ISO 13666, the term "back surface" is intended to mean the surface of a spectacle lens which is intended to face towards the eye in the spectacles. However, the term "front surface" and "back surface" could also be exchanged by "first surface" and "second surface", respectively. The "first surface", previously front surface, may then be defined as a, in particular convex, surface having a spherical, in particular and rotationally symmetric, or aspherical, in particular and plane-symmetric, shape. The "second surface", previously back surface, may then be defined as a, in particular concave, surface being asymmetric, in particular being a free-form surface.

The term "prismatic power" is intended according to No 10.9 of the standard DIN EN ISO 13666 to mean both the prismatic deviation and the base setting of the prismatic deviation. According to No 10.8, "prismatic deviation" is intended to mean the change in direction of a ray of light as a result of refraction. When a prismatic power is referred to in relation to a cross-sectional plane or in a cross-sectional plane, then this is intended to mean the prismatic power in the corresponding cross-sectional plane. The base position is defined according to No 10.7 of the standard DIN EN ISO 13666, and it may be indicated for example in polar coordinates according to the TABO scheme, the semicircular degrees of arc scheme widely known to the person skilled in the art.

The term "dioptric power" is intended to mean both the focal power and the prismatic power of a spectacle lens, cf. No 9.3 of the standard DIN EN ISO 13666.

The term "focal power" describes both the spherical and astigmatic powers of a spectacle lens at a particular point, cf. No 9.2 in the standard DIN EN ISO 13666. The terms "spherical power" and "astigmatic power" in this case refer to the definitions given in sections 11 and 12 in the standard DIN EN ISO 13666.

The term "for a user" is intended to mean the effect of the spectacle lens for the user for whom the spectacle lens is designed. Such a calculation "for a user" is therefore carried out on the basis of user data. In particular, these user data relate to a position of the assumed eye rotation point relative to the spectacle lens. In particular, the position of the eye rotation point is indicated as a distance from the back surface of the spectacle lens. In the case of a rotationally symmetrical spectacle lens, for example, the eye rotation point lies at a certain distance from the back surface of the spectacle lens on its optical axis.

"User data" may be both individual user data and standard user data. For example, a monofocal spectacle lens with a particular dioptric power may be configured for standard user data. Individual user data are, for example, recorded by an optician and sent to a spectacle manufacturer in order to calculate a shape of the spectacle lens.

The "box" or the "boxing system" is a system of dimensions and definitions which is based on a rectangle that is formed by the horizontal and vertical tangents to the outermost edges of the uncut lens blank. The "horizontal centerline" is the line which is equidistant from the two horizontal tangents. The "vertical centerline" is the line which is equidistant from the two vertical tangents. The point of intersection of the vertical centerline and the horizontal centerline is also referred to as the "geometrical center". In the case of a box for an edged spectacle lens in a frame, the point of intersection is also referred to as the "boxed center". Corresponding definitions may be found in section 5 in the standard DIN EN ISO 13666. More substantial standardization of the box system may be found in the standard DIN EN ISO 8624. The "spectacle plane" of spectacles is the plane which contains the vertical centerline of the first, or left spectacle lens and the vertical centerline of the second, or right spectacle lens. Even more substantial standardization of the box system, or box dimension, and the spectacle plane is also explained in the standard DIN 58208-1.9.

A "prescription" is commonly known as the optical values order to be fulfilled by an optical design to correct for the aberrations of the human eye of the wearer. In particular, the prescription can provide sphere cylinder and axis values or equivalent parameters. Further, an addition, that is, a difference between the near and the far portion of the lens can be prescribed as well as certain prismatic powers along an associated axis.

The "carrier point" on the back surface is the point from which the straight carrier lines emanate. It can be any point on the back surface of the lens. However, preferably it is the point within the surface area within the boundary line. In particular, the carrier point can be the visual point and/or the geometrical center of the uncut lens blank.

The "boundary line" determines the outer boundary of the back surface area to be preserved. The boundary line is not a straight line. It is a curve that encompasses the lenticular portion, that is, the back surface area to be preserved. It may be a closed line. However, it can also start and end on the outer edge of the uncut lens blank, that is, such that the encompassed surface area is "open" radially outwards.

A "curvature profile" means the curvature profile of the surface in a relative manner. In particular, a curvature profile of the back surface includes the curvatures, that is, the mere surface profile. However, an absolute position in the z-direction, that is, the absolute position relative to the front surface is not included in the curvature profile. Hence, if a curvature profile of the original shape of the back surface is "preserved" the relative sagittal heights of the back surface are preserved but the curvature profile as such may be moved in a translatoric manner relative to the front surface, that is, each point of the curvature profile is moved relative to the front surface in the same direction and by the same amount.

A "carrier line" as previously explained may be a straight carrier line running at a certain angle and emanating from the carrier point. For example, in case the carrier point is the geometrical center of the uncut lens blank, the angle would develop around the geometrical center line of the lens blank. In particular, a geometrical center point would be normal to the center of curvature of the front surface. In case the carrier point is not the geometrical center, a line parallel to the geometrical center line could be considered through the carrier point, and around that specific line the angles along which each carrier line runs can be developed. In general, a carrier line must not be straight. Bent carrier lines or carrier lines following any given path are also possible.

The "monotonic" transition means that the first derivate of the curvature or the curvature gradient does not change its algebraic sign during the transition. The algebraic sign is either only positive or only negative. Further, the curvature gradient may be constant.

Further, "transition" means that the predefined curvature value, in particular extreme curvature value, is approached from a curvature value different from the predefined curvature value, in particular extreme curvature value. The predefined curvature value may be a maximum or minimum curvature. Hence, in case of a minimum curvature, it is thus the smallest curvature of the back surface, in particular along a carrier line. Hence, in case of a maximum curvature, it is thus the largest curvature of the back surface, in particular along a carrier line. The direction of the curvature is different from the direction of the boundary line in a point on the back surface. The direction of the curvature is away from the boundary line towards the outer edge of the uncut lens blank, in particular along a respective carrier line. Further, in particular the boundary curvature is different from the predefined curvature value, in particular extreme curvature value. Therefore, transition means that the curvature gradient through the transition zone is not constantly at zero. As a mere example, in case the boundary curvature along a carrier line should be 5 dioptries and the predefined curvature value, in particular extreme curvature value, is defined to be 15 dioptries, the curvature will steadily raise from 5 to 15 dioptries without decreasing in between. In the transition portion, the curvature gradient would only be positive.

A curvature being "continuous" over a surface or along a line means that there are no discontinuities on the corresponding surface or along the respective line, that is, any kinks. In other words, along the boundary line, the curvature of the back surface within the boundary line equals the curvature of the back surface outside the boundary line. By this, a continuous curvature, in other words, a smooth surface is ensured. Of course, due to manufacturing tolerances, a kink might not be a sharp discontinuity but may actually comprise a very small curvature radius, for example below 5 mm or even below 2 mm. In particular, continuous shall then mean that the magnitude of a curvature radius of the back surface is always above 2 mm or is always above 5 mm.

A "thickness requirement" for the outer edge of the uncut lens blank is a condition or boundary condition of the target shape of the optimization process. For example, the thickness requirement may be a value set for the smallest thickness of the outer edge of an uncut lens blank along its periphery. This applies to plus lenses, in particular. As a further example, the thickness requirement may be a minimum thickness of the outer edge of an uncut lens blank along its periphery. Hence, a value for the smallest thickness of the outer edge of an uncut lens blank along its periphery has to be equal or larger than the minimum thickness. This applies to minus lenses, in particular.

In a refinement of the method according to the first aspect, the curvature of the back surface is continuous.

For example, the curvature of the back surface of the modified lens shape is determined to be continuous, for example during the determination in step e). In particular, the back surface or its curvature does not comprise any discontinuities. The back surface may be a smooth surface, in particular without any kinks or jumps, for example like a Fresnel layer. The continuous curvature of the back surface, for example, facilitates subsequent manufacturing of the uncut lens blank.

In a refinement of the method according to the first aspect, the uncut lens blank is a unitary element made of a single material.

For example, the uncut lens blank is determined to be a unitary element made of a single material in the method steps. The uncut lens blank being a unitary element made of a single material may still have a coating applied, for example to the front surface and/or the back surface. This, for example, facilitates subsequent manufacturing of the uncut lens blank. For example, no further Fresnel sheet needs to be attached.

In a refinement of the method according to the first aspect, the method further comprises providing an extreme curvature value of the back surface, in particular a maximum curvature or a minimum curvature, as the predetermined curvature value.

In a refinement of the method according to the first aspect, step c) comprises determining a carrier point on the back surface and at least one straight carrier line on the back surface, wherein each straight carrier line emanates from the carrier point, and, for each straight carrier line, determining a boundary curvature of the back surface at an intersection point of the respective straight carrier line and the boundary line.

In a refinement of the method according to the first aspect, step d) comprises determining, for each straight carrier line, a new curvature profile of the back surface along the respective carrier line from the intersection point to an outer edge of the uncut lens blank, wherein the curvature of the new curvature profile equals the boundary curvature at the intersection point and transitions monotonically from the boundary curvature to the extreme curvature value towards the outer edge.

In a refinement of the method according to the first aspect, the modified shape of the back surface is determined by an optimization towards a target shape, wherein the target shape includes:
i. the curvature profile of the original lens shape of the back surface within the boundary line, which curvature profile is fixed during the optimization,
ii. the curvature profile of each straight carrier line outside the boundary line, which curvature profile is fixed during the optimization, and
iii. the extreme curvature value for the back surface outside the boundary line,
and wherein the optimization applies the condition that a curvature of the back surface along the boundary line is continuous.

In a further refinement of the method according to the first aspect, the carrier point is the visual point according to the original lens shape, or the carrier point is the fitting point according to the original lens shape, or the carrier point is the geometrical center of the uncut lens blank, in particular so that the curvature is a tangential curvature of the back surface and each straight carrier line runs in a meridian of the front surface.

Of course, it can be the case that the visual point is also the fitting point and/or is also the geometrical center of the uncut lens blank. Further, in general with any refinement, it can be defined that the carrier point is the point in the intersection of the back surface with the axis of rotational symmetry of the front surface. This would in particular apply in case the front surface is a spherical surface. It may be preferred that the carrier point is the geometrical center of the uncut lens blank. In that case, each straight carrier line would run in a meridian of the front surface as the center of curvature of the front surface, of course, as in the geometrical center. This would also mean that the curvature, that is, the curvature along each straight carrier line, is a tangential or radial curvature of the back surface. The according shape is relatively swift to set up and to determine. As the optical area of the original shape which is to be preserved is usually in the center of the original shape, it usually makes sense to develop the thickness reduction around this point.

In a further refinement of the method according to the first aspect, a shape of a frame into which a final lens is to be inserted is provided, wherein a frame line is defined by a line along which the uncut lens blank is to be cut to fit into the frame, and wherein a shape of the boundary line corresponds to a shape of the frame line, in particular wherein a back surface area within the boundary line is less than, equal to or larger than a back surface area within the frame line.

In general, the boundary line could have any arbitrary shape. In this context "shape" means the general geometrical figure of a two-dimensional projection of the surface areas surrounded by the boundary line, or within the frame, in other words the "shadow". It has been found to be aesthetically advantageous if the shape of the boundary line corresponds to the shape of the frame line. However, this does not necessarily mean that the boundary line is equal to the frame line. The boundary line may also encompass the surface that is less than, equal to or larger than the back surface area within the frame line. Hence, in general, the boundary line can be the frame line scaled by any factor larger than, equal to or smaller than one.

In a further refinement of the method according to the first aspect, the curvature of a straight carrier line, after the curvature has reached the predefined curvature value, in particular extreme curvature value, remains constant at the predefined curvature value, in particular extreme curvature value, towards the outer edge, in particular until the straight carrier line reaches the outer edge.

Keeping the curvature at the predefined curvature value, in particular extreme curvature value, will provide for the whole margin portion having the same extreme curvature at the predefined curvature value, in particular extreme curvature value. This leads to a maximum reduction of the thickness of the uncut lens blank resulting.

In a further refinement of the method according to the first aspect, a multitude of straight carrier lines is determined, in particular wherein a separation between adjacent straight carrier lines is between 0.5 and 10 degrees, preferably 1, 2 or 3 degrees.

Of course, this means that, for example, in case any straight carrier line runs within a meridian of the front surface, the so-determined separation angle is also the angle between the meridians. This angle of separation determines the angle between two radial directions of adjacent straight carrier lines. The separation used may depend on the processing resources reserved for the method. It may further depend on how exactly a subsequent optimization process shall be supported. The lower the separation angle is, the more carrier surfaces are determined providing more exact starting conditions for the subsequent optimization process. This will provide more control over the optimization.

In a further refinement of the method according to the first aspect, the original lens shape provides for a positive focal power, wherein the predefined curvature value, in particular extreme curvature value, is a maximum, in particular positive, curvature value, and wherein, during the optimization, a predefined minimum thickness of the outer edge of the uncut lens blank is applied to the target shape as a mandatory condition, in particular so that, during the optimization, a sagittal height of the fixed or preserved curvature profile of the original lens shape of the back surface within the boundary line is adjusted while the fixed or preserved curvature profile is maintained.

This refinement in particular deals with so-called "plus lenses", that is, lenses of positive focal power. In ophthalmics, usually meniscus lenses are used. Such convex-concave lenses can be either positive or negative, depending on the relative curvature of the two surfaces. Hence, a negative meniscus lens or a minus lens has a concave surface (back surface) with a higher curvature than that of the front surface. Such a negative lens will be thinner at the center that at the periphery or outer edge. Conversely, the positive meniscus lens or plus lens has a convex surface (front surface) with a higher curvature than the concave surface and, hence will be thicker at the geometrical center than at the periphery or outer edge. Therefore, dealing with plus lenses, these lenses will thin out towards the periphery. Applying the current method, the thickness of the back surface will rapidly increase in the margin region towards the periphery or outer edge. However, this is not necessary as the goal of the method would be to reduce the center thickness of such plus lens. Hence, taking into account manufacturing tools, in particular blocking pieces, a minimum requirement for the thickness of the uncut lens blank around its periphery is to be observed as a mandatory condition. Then, during optimization, this has the effect that, while keeping the curvature profile within the boundary line and keeping the new curvature profiles along the carrier lines, the back surface is "moved" towards the front surface during optimization so that a minimum thickness on the periphery becomes the predefined minimum thickness. Therefore, as the curvature in the margin region of the modified lens shape is higher than that of the original lens shape, the optically preserved surface area within the boundary line is "raised" towards the front surface. The center thickness thus decreases.

In a further refinement, a second optimization is conducted subsequent to step e), wherein the further optimization uses the modified shape of the back surface as an initial shape and optimizes only the curvature profile within the boundary line towards a prescription or the predetermined optical properties of the original lens shape, in particular taking into account the reduced center thickness of the modified lens shape.

In case of positive lenses, due to the reduced center thickness and as the lenses are "real lenses" and not "ideal lenses" the reduced center thickness has an effect on the optical properties of the fixed curvature profile within the boundary line. To restore these optical properties, further optimization may be conducted by using the curvatureprofile which was fixed as a starting condition for a further optimization that readjusts a curvature profile to the reduced center thickness. However, such readjustment has only to be conducted in case the center thickness reduction and the associated deterioration of the optical properties is considered significant. In fact, there are other measures conceivable to restore the optical properties. For example, as the lens will always become thinner, it may be a measure to readjust the curvature radius of the front surface. The front surface would only need to be ground with a slightly higher curvature to compensate for the reduced thickness. It may then be an option to set the predefined minimum thickness of the outer edge for example 5% or 10% or 20% higher than the actual minimum thickness to assure that a minimum thickness will still be preserved in case the front surface is ground with a higher curvature, for example, in case the minimum thickness shall be 1 mm. The method could be conducted with a predefined minimum thickness of 1.1 or 1.2 mm so that, when the front surface is ground with a higher curvature, a minimum thickness of 1.0 mm is preserved around the periphery. However, as not the whole front surface would need to be ground with a higher curvature but only an area within the frame line or within the boundary line, this may not be needed. As a last measure, it may be an alternative to already calculate the original lens shape with a center thickness which is smaller than that of the actual center thickness of the original lens shape. Hence, the back surface of the original lens shape would then not provide for ideal optical properties within the boundary line, but, after thickness reduction according to the disclosed method, would then fit to the reduced lens thickness.

In a further refinement of the method according to the first aspect, the original lens shape provides for a negative focal power, wherein the predefined curvature value, in particular extreme curvature value, is a minimum, in particular negative, curvature value, and wherein, during the optimization, a sagittal height of the fixed curvature profile of the original lens shape of the back surface within the boundary line is fixed, in particular wherein, as the thickness requirement, a minimum thickness of the outer edge is applied as a mandatory boundary condition during the optimization process.

In this case, the thickness of the original lens shape in the center is lower than that on the periphery. Hence, the critical thickness to be reduced is that on the outer edge or periphery. Therefore, in this case no readjustment of the optical properties of the fixed curvature profile within the boundary line is needed. Hence, a sagittal height of the fixed curvature profile of the original lens shape within the boundary line remains fixed. However, there may still be provided a mandatory condition of a minimum thickness of the outer edge so that proper blocking around the periphery can be conducted and not too much thickness reduction is conducted around the outer edge.

In a further refinement of the method according to the first aspect, the method further comprises defining a transition zone adjacent to the boundary line towards the outer edge in which transition zone the curvature transitions monotonically from the boundary curvature to the predefined curvature value, in particular extreme curvature value, towards the outer edge of the uncut lens blank, and wherein the transition zone is set as a minimum length, in particular along each carrier line, in particular wherein the transition zone is defined previous to step d).

The term "transition zone" is used during the description of the method and can be considered equivalent to the "transition portion" used when describing the back surface of the uncut lens blank. To ensure the optical preservation of the surface area within the boundary line and to further ensure that the uncut lens blank according to the modified lens shape, in particular the back surface, can actually be manufactured according to the shape, a transition zone can be defined. By defining a minimum length along each carrier line, it can be provided for a protection of the surface area within the boundary line from the cutting and polishing processes. For example, the length of the transition zone along each carrier line can be defined as having a length of 5 mm. The actual length will highly depend on the corresponding cutting and polishing tools. In general, the transition zone can have a length of 1 to 10 mm, preferably 2 to 8 mm, in particular 1, 2, 3, 4, 5, 6, 7, 8 mm.

In a further refinement of the method according to the first aspect, the method further comprises defining a transition zone adjacent to the boundary line towards the outer edge of the uncut lens blank in which transition zone the curvature transitions monotonically from the boundary curvature to the predefined curvature value, in particular extreme curvature value, towards the outer edge, and wherein the transition zone is set by defining a maximum magnitude for a gradient of the curvature along each carrier line, in particular wherein the transition zone is defined previous to step d).

In particular for minus-lenses, the transition zone can also be defined by defining a maximum magnitude for a gradient of the curvature, in particular along each carrier line. By this, the transition from the specific curvature at the boundary line towards the predefined curvature value, in particular extreme curvature value, can be defined. Lower gradients will provide for a larger length of the transition zone along the carrier line, higher gradients will reduce the length of the transition zone but will enable for a better reduction of the lens thickness. The gradient can, again, depend on the corresponding surfacing tools available.

In a further refinement of the method according to the first aspect, in step d), each new curvature profile is determined with an essentially constant curvature gradient, in particular constant curvature gradient, for the transition from the boundary curvature to the predefined curvature value, in particular extreme curvature value.

The curvature gradient along each line within the transition zone can be essentially constant or in particular exactly constant. Of course, tolerances of manufacturing apply. By providing for constant gradient, an aesthetically advantageous shape that is less likely to be considered disturbing by a wearer can be provided.

In a further refinement of the method according to the second aspect, it can be provided that step C) further comprises specifying a hard-limit predefined curvature value, in particular extreme curvature value, which has a larger magnitude than the recommended predefined curvature value, in particular extreme curvature value, and wherein, subsequent to sequence step III., the hard-limit predefined curvature value, in particular extreme curvature value, is applied as the predefined curvature value, in particular extreme curvature value, during optimization.

By this, in case after step III the specified maximum lens thickness is not reached, a last effort could be made to end up with a satisfying shape. However, then a warningshould be returned so that the corresponding lens shape is marked and can be, for example, monitored specifically during manufacturing.

In a further refinement of the method according to the second aspect, a maximum lens thickness along the frame line of a modified lens shape of the last iteration of step C) is below the specified maximum lens thickness, and wherein a further iteration is conducted between the modified lens shape is of the last two iterations of step C) to match the maximum lens thickness along the frame line to the specified maximum lens thickness.

In case in the last iteration, the lens thickness is lower than the specified maximum lens thickness, an iteration between the last two steps could be conducted to exactly match a maximum lens thickness. This provides the advantage that also the maximum achievable eye rotation angle can be achieved which might be given priority.

Further, the method according to the third aspect, namely the method of manufacturing, can provide the further step of edging the uncut lens blank, in particular along the frame line. Then, a final lens is achieved with a reduced lens thickness along the frame line to ensure the corresponding final lens can be inserted into a corresponding frame.

In a further refinement of an uncut lens blank, in particular according to the fourth aspect, the lenticular portion has a surface profile that is asymmetric, in particular which surface profile is a free-form surface profile.

In a further refinement of an uncut lens blank, the extreme curvature value is a smallest or lowest, in particular signed, curvature of the back surface along the straight line or the extreme curvature value is a largest or highest, in particular signed, curvature of the back surface along the straight line. In particular, the smallest curvature may even be negative. In particular, a curvature providing for −4 diopters is to be considered smaller or lower than a curvature providing for +2 diopters.

In a further refinement of an uncut lens blank, the transition portion completely surrounds the lenticular portion.

In a further refinement of an uncut lens blank, the margin portion extends up to an outer edge of the uncut lens blank along the straight line, and the margin portion circumferentially extends along at least a part of the outer edge of the uncut lens blank.

In a further refinement of an uncut lens blank, the margin portion circumferentially extends along the complete outer edge of the uncut lens blank.

In a further refinement of the uncut lens blank, the point is the geometrical center of the uncut lens blank, or the point is the visual point, in particular wherein the location of the visual point is coded in an engraving in the lens blank, or the point is the fitting point, in particular wherein the location of the fitting point is coded in an engraving in the uncut lens blank. Hence, the same features as described for the methods according to the first to third aspects above can also apply to structural features defining the uncut lens blank according to the invention. Of course, this applies to all features mentioned and concerning the methods.

Further, the predefined curvature value, in particular extreme curvature value, of the uncut lens blank in the margin portion can be between 10 and 20 diopters in curvature which would equal 53 to 26.5 mm in radius. In general, throughout the application, the curvatures in diopters are given with a refractive index of 1.53. Hence, in case a curvature is given in diopters, the corresponding curvature in radius can be calculated by r=1.53-1/diopters. This will provide for the radius in meters. This recalculation is well known to persons skilled in the art with a known refractive index which is 1.53 throughout the application. In particular, the, in particular signed, predefined curvature value or extreme curvature value can be equal to or larger than 14 diopters. In particular, this may also be expressed as a positive curvature radius. A magnitude of the curvature radius may then be equal to or lower than 37.85 mm in radius, for the reference refractive index of 1.53, in order to provide for a power equal to or larger than 14 diopters. In particular, the curvature can be 14 to 18 diopters. In particular, it can be 14, 15, 16, 17, 18, 19, 20 diopters. Preferably it is 16 diopters as a standard tool for a free form generator which is about 33 mm in radius or about 16 diopters in curvature.

This value for the predefined curvature value, in particular extreme curvature value, may apply for plus lenses. In case of minus lenses, the, in particular signed, predefined curvature value or extreme curvature value may be equal to or lower than −4 diopters. In particular, this may also be expressed as a negative curvature radius. A magnitude of the negative curvature radius may then be equal to or lower than 132.5 mm, for the reference refractive index of 1.53, in order to provide for a power equal to or lower than −4 diopters. In particular, the predefined curvature value, in particular extreme curvature value, may be between −4 and −8 diopters, in particular −4, −5, −6, −7, −8 diopters. Preferably, the predefined curvature value or extreme curvature value is set to −6 diopters. The gradient of curvature may be set between 1 diopter/mm to 4 diopters/mm, in particular 1, 2, 3, 4 diopters/mm. In particular, a recommended gradient could be 2 diopters/mm and a maximum or hard limit could be 3 diopters/mm.

In general, a minimum eye rotation angle could be set between 20 and 50 degrees, in particular 20, 25, 30, 35, 40, 45 degrees. Preferably, a recommended eye rotation angle is 45 degrees and a minimum limit at 35 degrees.

It is to be understood that the features mentioned above and those yet to be explained below may be used not only in the combination respectively indicated, but also in other combinations or separately, without departing from the scope of the present invention.

BRIEF DESCRIPTION OF THE SEVERAL VIEWS OF THE DRAWING

Embodiments of the invention are represented in the drawing and will be explained in more detail in the description below.

FIG. 1 shows an embodiment of a method according to a first aspect of the invention, FIG. 2A shows a simplified diagram showing and illustrating an embodiment of the different steps of the method in FIG. 1, FIG. 2B shows a further general simplified diagram showing and illustrating the different steps of the method for plus lenses and for minus lenses, FIG. 6 shows diagrams illustrating the effects of different approaches for the determination of the new curvature profile, in particular a transition zone having a constant curvature gradient.

DETAILED DESCRIPTION OF THE INVENTION

Figure 3:
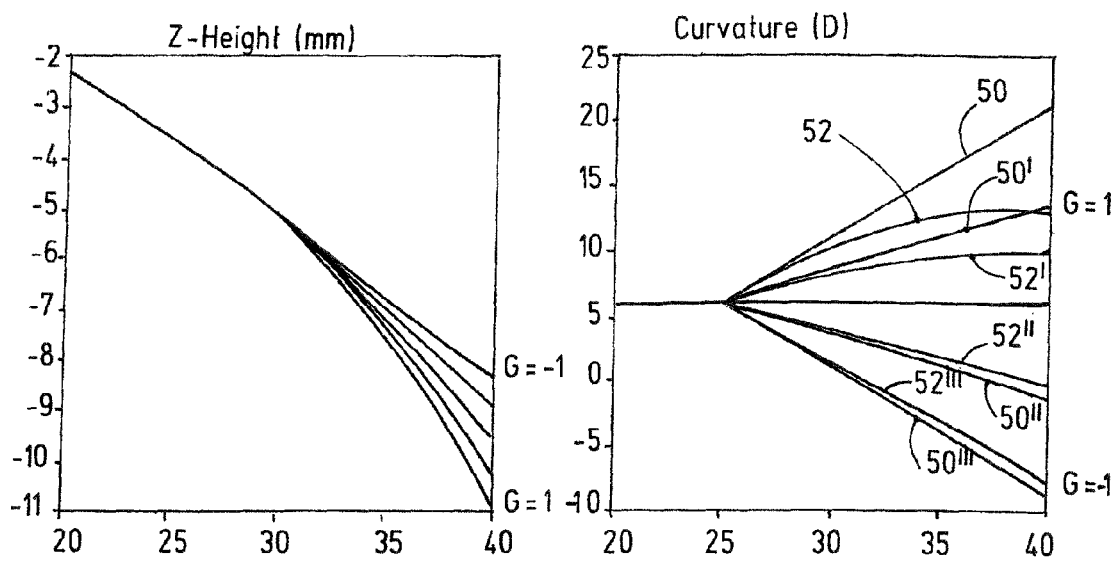
FIG. 3 shows diagrams for illustrating a determination of the new curvature profile.

FIG. 1 shows an embodiment of the method according to the first aspect of the invention. The method is generally designated by reference numeral 100.

The method is in particular a computer-implemented method. As a result, the method provides for a modified lens shape for an uncut lens blank, in particular through the use of a non-transitory computer readable medium. The modified lens shape provides for a reduced thickness compared to the original lens shape.

The conduction of the method, in the following, is explained viewing both FIGS. 1 and 2.

At first, a step 102 is conducted of providing an original lens shape 10 of an uncut lens blank. The original lens shape 10 comprises an original shape of a front surface and a back surface of the uncut lens blank. In particular, the original shape is designed according to a prescription. Further, a predefined curvature value of the back surface is provided. This predefined back curvature value is preset and may for example be 15 diopters or an equivalent in radius. In particular, that predefined curvature value should be chosen according to an extreme curvature value that can be manufactured by an associated free-form surfacing tool. Hence, in the following, the predefined curvature value may also be referred to as the extreme curvature value.

In FIG. 2A, the uncut lens blank 10 is schematically shown with a view on the back surface in the upper left. The modification then follows the arrows to the bottom line. The uncut lens blank has a periphery or outer edge of the lens blank 16. A minimum eye rotation angle that shall be preserved concerning the optical properties of the back surface may be provided, however, that is not necessary. Further, a carrier point is determined on the back surface. Preferably, that carrier point is the geometrical center of the uncut lens blank. The periphery of the uncut lens blank may have the form of a circle or an ellipse. Then, in a step 104, a boundary line 18 is determined. In particular, a curvature profile of the original shape of the back surface is to be preserved within the boundary line 18. Further in particular, the carrier point 14 is set on the back surface, in the given example in the geometrical center, and a boundary line 18 on the back surface is determined, in particular when a curvature profile of the original shape of the back surface is to be preserved within the boundary line 18. Hence, as shown in the upper right of FIG. 2A, the boundary lane 18 will usually be drawn to enclose the intended minimum eye rotation angle 12. The shape of the boundary line may be chosen to be identical to the shape of the frame into which the final lens is to be inserted. In the given example in FIG. 2A, the size of the boundary line 18 is chosen to be of the same size as the frame. Within the boundary line 18, the curvature profile of the original lens shape 10 is to be preserved. The rest of the original lens shape of the back surface can be considered cut off. Hence, only a dashed line 26 of the original periphery is shown. The lens shape will now be modified so that in a margin region or margin portion 28, the extreme value for the curvature will be present. In a transition portion or transition zone 24, the curvature gradient will transition from the curvature of the preserved lens shape within boundary line 18 towards the extreme curvature value 28. Hence, an outer transition line 22 can be considered to be the outer boundary of the transition zone 24 with the boundary line 18 being the inner boundary line of the transition zone 24. However, the transition zone 24, the margin portion 28 and that outer boundary line 22 are yet to be determined in the following steps. They are merely explained in the example in the upper right of FIG. 2A for illustration purposes. In the example of FIG. 2A, the original lens shape provides for a positive focal power or is a "plus lens".

In a next step 106, a boundary curvature of the back surface 72 at the boundary line 18 is determined. In particular, at least one straight carrier line 30 to 37 on the back surface is determined, wherein each straight carrier line emanates from the carrier point 14 and, for each straight carrier line 30 to 37, a boundary curvature of the back surface at an end of the section point of the respective straight carrier line 30 to 37 at the boundary line 18 is determined.

Examples of intersection points are designated by reference numeral 29. Each straight carrier line 30 to 37 runs in a different angle φ. As in the given example the periphery of the uncut lens blank 10 has the form of a circle, each carrier line runs in a plane that cuts through the full diameter of this circle. As in the given example the front surface has a spherical shape, and the carrier point 14 as in the geometrical center, each carrier line 30 to 37 runs in a meridian of the front surface. In the provided example, eight carrier lines are used so that a separation angle φ between them is 45 degrees. However, any different number of carrier lines could be used.

Now, in step 108, a new curvature profile 38 of the back surface 72 lies between the boundary line 18 and an outer edge 16 of the uncut lens blank 10. The curvature of the new curvature profile 38 equals the boundary curvature at the boundary line 18 and transitions monotonically and continuously from the boundary curvature towards the predefined curvature value towards the outer edge 16. In particular, for each straight carrier 30 to 37, a new curvature profile of the back surface along the corresponding carrier line from the intersection point 29 to an outer edge or periphery 16 of the uncut lens blank is determined, wherein the curvature of the new curvature profile 38 equals the boundary curvature of the intersection point 29 and transitions monotonically form the boundary curvature to the extreme curvature value towards the outer edge 16.

In FIG. 2A, this is shown in the middle right. On the boundary line 18, that is in the intersection point 29, the curvature of the new curvature profile within the plane of the straight carrier line, that is, in the given example the tangential or radial curvature, equals the curvature of the optically preserved surface area of the original lens shape 10 within the boundary line 18. That means that curvatures inside and outside the boundary line equal each other approaching the boundary line 18. Hence, the curvature along the boundary line is determined to be continuous. That means no kink is provided at the boundary line 18. Further, in the given example of a plus lens, a length of the transition zone 24 is set based on an associated free-form manufacturing tool so that it is ensured that the modified back surface can be manufactured without damaging the optically preserved surface, in particular free-form surface, within the boundary line 18. For example, a radial length, i.e. the length within the plane of the carrier line, or the meridian of the carrier line, is set, in particular for example to a value of 5 mm.

In the transition zone in the margin region 28, an extreme value for the curvature is provided, for example 15 diopters. By this, a new curvature profile 38 is determined for each carrier line as will be explained in more detail below, with a constant curvature gradient along the transition zone or at least an essentially constant gradient along the transition zone by approximation with a cubical polynomial. This then leads to the new curvature profiles of each carrier line 30 to 37. The result is shown in the middle right. The curvature profile of the original shape within the boundary line 18 is fixed with the new curvature profiles outside the boundary line 18 attached to it. In the straight view in the back surface, hence in this stage, the determined and fixed back surface profile looks like a "spider" with the optically preserved curvature profile within the boundary line 18 being the body and each new curvature profile along a carrier line forming one leg.

Then, in step 110, a modified lens shape 40 of the uncut lens blank is determined, wherein the modified lens shape 40 comprises the original shape of the front surface 70, and a modified shape of the back surface 72, wherein the modified shape of the back surface 72 is determined by an optimization based on the new curvature profile, and wherein, during optimization, the original lens shape 10 is preserved within the boundary line 18. In particular, a modified lens shape is determined of the uncut lens blank, wherein the modified lens shape comprises the original lens shape of the front surface and a modified shape of the back surface, wherein the modified shape of the back surface is determined by an optimization towards a target shape. Such optimization towards target shapes is commonly known to a person skilled in the art by the use of a target shape or merit function and optimization techniques, for example the square optimizations based on these target shape and/or merit functions.

For subsequent manufacturing, a complete description of the back surface is needed. Hence, the back surface between the "spider legs" is yet to be determined. Further, it may be necessary to further readjust the sagittal height of the fixed curvature profile within the boundary line in case of a plus lens. The optimization is conducted towards a target shape, wherein the target shape includes the curvature profile of the original lens shape, that is, just the curvature profile and not necessarily the sagittal height above the front surface, of the back surface within the boundary line which go to profile is fixed during the optimization. Further, it comprises the curvature profile of each straight carrier line, that is, the new curvature profile, outside the boundary line which curvature profile is fixed during the optimization. Further, it includes the extreme curvature value for the back surface outside the boundary line. By this, through the optimization, a complete description of a back surface can be provided that includes the curvature profile of the original lens shape within the boundary line 18, the determined new curvature profiles along each carrier line and a further back surface that best possible approaches the extreme curvature value outside the boundary line. For minus-lenses, the method could then already end here. However, in case of plus-lenses as in the example given in FIG. 2A, it is the case that just by increasing the curvature as quickly as possible to an extreme curvature value, which is in case of plus lenses a maximum curvature, the lens thickness around the periphery is larger than a preset minimum lens thickness needed for sufficient blocking of the uncut lens blank. Hence, it is not possible to readjust the sagittal height of the optically preserved section within the boundary line 18 together with the modified back surface shape so that around the periphery, the minimum lens thickness is the minimum lens thickness needed for manufacturing. This can all be conducted within the optimization as such and does not necessarily need to be a separate optimization step. By this, the original lens curvature profile shape within the boundary line 18 is "raised" towards the front surface, in particular its sagittal height above the front surface is reduced. Hence, the center thickness of the plus lens is reduced. Then, by this, there is provided a plus lens shape with a reduced thickness. In case the reduced lens thickness should be considered significant so that, due to the reduced thickness and the conditions of a real lens, the optical properties within the boundary line 18 may be deteriorated, a further optimization step may be conducted that starts on the original lens shape of the back surface and readjusts it to restore the optical properties of the original lens shape.

FIG. 2B shows further simplified illustrations to generally show the development of the lens shape through the method. FIG. 2B is generally independent of FIG. 2A. In the left column, the development of a shape of a plus lens is shown. In the right column, the development of a shape of a minus lens is shown.

Concerning the plus lens, from top to bottom, an original lens shape 10 of an uncut lens blank 60 having a front surface 70 and a back surface 72 is provided, wherein the original lens shape 10 comprises an original shape of the front surface 70 and an original shape of the back surface 72 of the uncut lens blank 60, such that the uncut lens blank 60 satisfies predetermined optical properties. Then, a boundary line 18 on the back surface 72 is determined, wherein a curvature profile 20 of the original shape of the back surface 72 is to be preserved within the boundary line 18. Then, a boundary curvature of the back surface 72 at the boundary line 18 is determined. Then, a new curvature profile 38 of the back surface 72 between the boundary line 18 and an outer edge 16 of the uncut lens blank 60 is determined, wherein a curvature of the new curvature profile 38 at the boundary line 18 equals the boundary curvature and transitions monotonically and continuously towards the outer edge 16 from the boundary curvature towards a predefined curvature value. In the case of the plus lens, the original lens shape 10 provides for a positive focal power, wherein the predefined curvature value is a maximum curvature value, and wherein, as the thickness requirement, a predefined value for a smallest thickness of the outer edge 16 of the uncut lens blank 60 is applied as a mandatory condition. This is the value z which shall be reached for the smallest thickness of the lens shape along its periphery. Hence, a modified lens shape 40 of the uncut lens blank 60 is determined, wherein the modified lens shape 40 comprises the original shape of the front surface 70, and a modified shape of the back surface 72, wherein the modified shape of the back surface 72 is determined by an optimization procedure based on the new curvature profile towards a target shape, and wherein the target shape includes the preserved curvature profile of the original lens shape 10 within the boundary line 18 and the thickness requirement for the outer edge 16 of the uncut lens blank 60. This leads to the new curvature profile of the back surface being determined which is then moved towards the front surface until the thickness requirement is fulfilled. Of course, although shown as two separate illustrative steps, the determination of the new curvature profile and the translationalmovement towards the front surface may be conducted simultaneously during an optimization procedure.

Concerning the minus lens, from top to bottom, an original lens shape 10 of an uncut lens blank 60 having a front surface 70 and a back surface 72 is provided, wherein the original lens shape 10 comprises an original shape of the front surface 70 and an original shape of the back surface 72 of the uncut lens blank 60, such that the uncut lens blank 60 satisfies predetermined optical properties. Then, a boundary line 18 on the back surface 72 is determined, wherein a curvature profile 20 of the original shape of the back surface 72 is to be preserved within the boundary line 18. Then, a boundary curvature of the back surface 72 at the boundary line 18 is determined. Then, a new curvature profile 38 of the back surface 72 between the boundary line 18 and an outer edge 16 of the uncut lens blank 60 is determined, wherein a curvature of the new curvature profile 38 at the boundary line 18 equals the boundary curvature and transitions monotonically and continuously towards the outer edge 16 from the boundary curvature towards a predefined curvature value. In the case of the minus lens, the original lens shape 10 provides for a negative focal power, wherein the predefined curvature value is a minimum curvature value, and wherein, as the thickness requirement, a sagittal height of the fixed curvature profile of the original lens shape 10 of the back surface 72 within the boundary line 18 is fixed, and wherein a minimum thickness of the outer edge 16 is applied as a mandatory boundary condition during the optimization process. Hence, the thickness of the modified shape is equal to or larger than the boundary condition applied as the thickness requirement. Hence, a modified lens shape 40 of the uncut lens blank 60 is determined, wherein the modified lens shape 40 comprises the original shape of the front surface 70, and a modified shape of the back surface 72, wherein the modified shape of the back surface 72 is determined by an optimization procedure based on the new curvature profile towards a target shape, and wherein the target shape includes the preserved curvature profile of the original lens shape 10 within the boundary line 18 and the thickness requirement for the outer edge 16 of the uncut lens blank 60. This leads to the new curvature profile of the back surface being determined. Of course, as shown, the minimum curvature of the back surface might be set even negative so that the curvature changes from a positive curvature to a negative curvature during transition from the boundary line towards the outer edge.

Essentially two different methods are for determining the carrier curves or lentics that have a "constant" or essentially constant curvature gradient from the intersection point out to some extreme curvature value (or maximum radius) along each carrier line. The only difference between the so-called "simple" and "complex" methods is how exactly it is ensured that the gradient is constant. The simple method just uses a cubic polynomial in the transition zone, while the complex method uses a (fairly) rigorous calculation of a section with constant curvature gradient.

In the following, the simple method is described first.

The equation for the tangential curvature T along each carrier line, in other words at a specific angle θ, is linear in the second derivative, and nonlinear in the first derivative;

$$T = \frac{Z_{rr}}{(1+Z_r^2)^{3/2}} \quad (1)$$

where $Z_r$ and $Z_{rr}$ are the first and second derivatives along a radius of the surface $Z(r, \theta)$. Taking the derivative with respect to r gives the tangential curvature gradient $$T_r = \frac{Z_{rrr}}{(1+Z_r^2)^{3/2}} - \frac{3Z_r Z_{rr}^2}{(1+Z_r^2)^{5/2}}. \quad (2)$$

For an essentially flat curve the curvature gradient is directly proportional to the third derivative. Therefore, a simple third order polynomial would have a constant curvature shape. For a cubic polynomial with significant slope the gradient would not remain constant, but at least it can be specified at one point. Solving for $Z_{rrr}$ gives $$Z_{rrr} = T_r(1+Z_r^2)^{3/2} + \frac{3Z_r Z_{rr}^2}{(1+Z_r^2)}. \quad (3)$$

The idea is to make a simple modification to a quadratic extrapolation feature by adding a cubic term that gives the surface a specified tangential power gradient past the boundary line. If we call the boundary location r=0, the desired gradient at the boundary $g=T_r(0)$, then the polynomial extension along one line is just $$Z=a+br+cr^2+dr^3 \quad (4)$$

where a, b, and c are determined from the original function of the original lens design at the interface or intersection point, and d can be derived from the equation (3);

$$d = \frac{g}{6}(1+b^2)^{3/2} + \frac{2bc^2}{(1+b^2)}. \quad (5)$$

In the above expression g has the units of 1/r. If the gradient G is to be specified in diopters per mm, then substitute, g=G/530, and measure r in millimeters (the constant 530 resulting from the assumed refractive index of 1.53).

The graph in FIG. 3 shows the result of extending a 6 diopter circle past r=25 mm with various values for the initial gradient G. The curves 50 show the lines of constant gradient. The lines 52 show the lines determined according to the above. For the negative gradients the cubic approximation works well, but fails with increasing gradient. That is because the slope of the curve is increasing with increasing gradient, and the nonlinear effect of the slope becomes more important.

In the following, the complex method is described.

Figure 4:
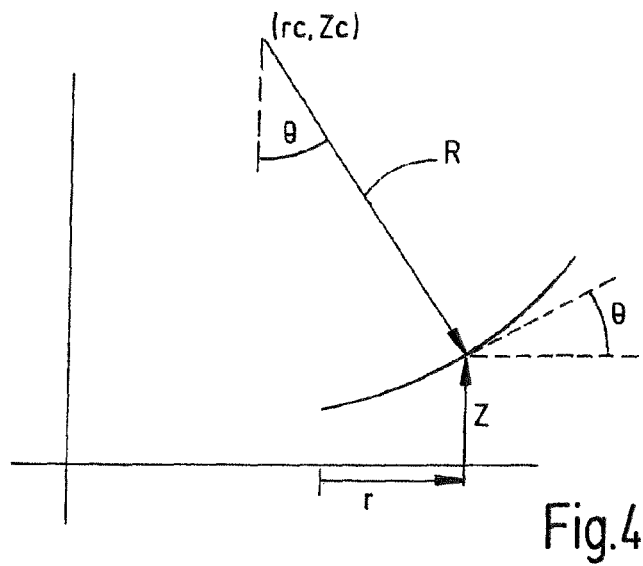
FIG. 4 shows a diagram for illustrating a further determination of the new curvature profile.

To get full control of the curvature gradient, a basis can be document EP 0 271 920 A1 "Progressive power ophthalmic lens" and the documents of its patent family. That document describes the "involute of the evolute" method of constructing an eyepath. The only modification is not to start the integration at a point with zero slope. The picture in FIG. 4 is used for the explanation. For every point (r, z) on the curve there is an associated point $(r_c, z_c)$ for the center of curvature of the "osculating" circle at that point.

The critical item is that the angle θ can be calculated by the following formula $$\sin\theta = \sin\theta_0 + \int_0^r \frac{d\rho}{R(\rho)} \quad (6)$$

where $\tan\theta_0 = dz/dr$ at r=0; the starting point of the extension in order to simplify the mathematical description. So if the curvature profile, preferably in a continuously integrable way, is specified, the angle can be determined. In particular in case the curvature is to have a constant gradient then $$\frac{1}{R(r)} = \frac{1}{530}(P_0 + Gr) \quad (7)$$

and therefore $$\sin\theta = \sin\theta_0 + \int_0^r \frac{d\rho}{530}(P_0 + G\rho) = \frac{1}{530}\left(P_0 r + G\frac{r^2}{2}\right) \quad (8)$$

Next, those angles are inserted into the equations for $r_c$ and $z_c$ (from geometry)

$$r_c = r - R\sin\theta \quad (9)$$

$$z_c = z(0) + R\cos\theta + \int_0^r \tan\theta \, d\rho \quad (10)$$

The answer for the integral of the tangent has to be determined via appropriate solving means, for example numerical approaches for solving integral equations as commercially available. Once R, $r_G$, and $z_c$ are known, the involute is just a moving circle;

$$z = z_c \pm \sqrt{R^2 - (x - x_c)^2} \qquad (11)$$

where the ± has the opposite sign as R. The sign convention is circles with positive sagitta give positive curvatures.

Figure 5:
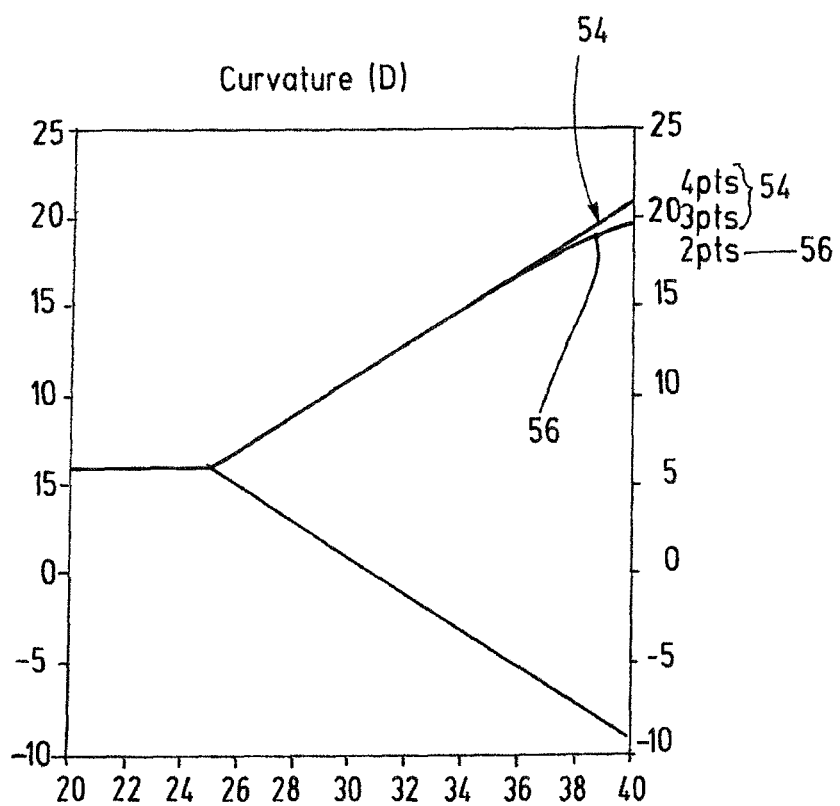
FIG. 5 shows a further diagram for illustrating the further determination of the new curvature profile.

For the integration, various orders of Gaussian-Legendra quadrature have been applied. Plots of the G=+/−1 are shown in FIG. 5 using sums of 2, 3, and 4 points to approximate the integral. Only the two point summation 56 is drifting a bit at the highest curvatures (beyond the maximum curvature for a typical cutting tool, for example) from the sums of 3 and 4 points to 54.

Differences between the simple and the complex method may not be significant in practical applications. A smooth carrier for a high minus lens will use a high negative gradient, that is, as high as a wearer can tolerate. There will be a great amount of distortion, to the point that there is only a small chance that the wearer will try to look through that area of the lens. In that case, it is only of minor importance if the gradient is exactly constant. For the application in plus lenses, the surface will usually only be modified past the edge of the frame or frame line, and the power or curvature will be rapidly increased to the maximum allowed by the tools. Therefore, as long as "some" cubic polynomial can reach the maximum curvature quickly enough the inconstant gradient cannot be an issue. Hence, in a further example only a minus lens example will be compared.

The plots in FIG. 6 are for a smooth carrier example. The lens is a Mitsui MR8 Elan HD +2.50 addition with prescription of −7 and a CT of 1.5 mm. The three maps on the top row show the lens thickness of the three different versions of the lens, contoured at 1 mm intervals. The map of the left is of the original optically optimized lens shape. The two outlines show the frame shape and the elliptical boundary selected for the start of the smooth carrier. Line 58 is the frame line. Line 18 is the boundary line. The central plot "constant gradient" is the thickness after a carrier curve is applied to the back surface, calculated using the constant gradient method with a gradient of −2 Diopters per millimeter. The map on the right "cubic extension" used the simple cubic extension method, with an initial gradient of the same −2 D/mm.

The graphs below are overlays of the results of the three different versions of the lens. The maximum edge thickness occurs along the 170 degree meridian for all three lenses. The back vertex power along that meridian shows the linear increase in power for the constant gradient method, along with the not quite as straight curve for the cubic method. The vertical line shows the extent of the frame. The plot of the lens thickness along that same meridian shows the similarity between the two carrier surface methods. The final graph on the right shows the lens thickness around the frame. The maximum edge thickness of the original frame was 8.04 mm, the constant gradient method brought that down to 6.78, while the cubic extension peaked at 6.85.

That is about 5% less reduction for the cubic method using the same initial gradient, and of course that could be made up by adjusting up the initial gradient of the cubic method by 5%. Therefore, the implementation of the cubic method would be significantly simpler than the full constant gradient method, but gives only slightly less control over the curvature profile of the back surface.

Figure 7A:
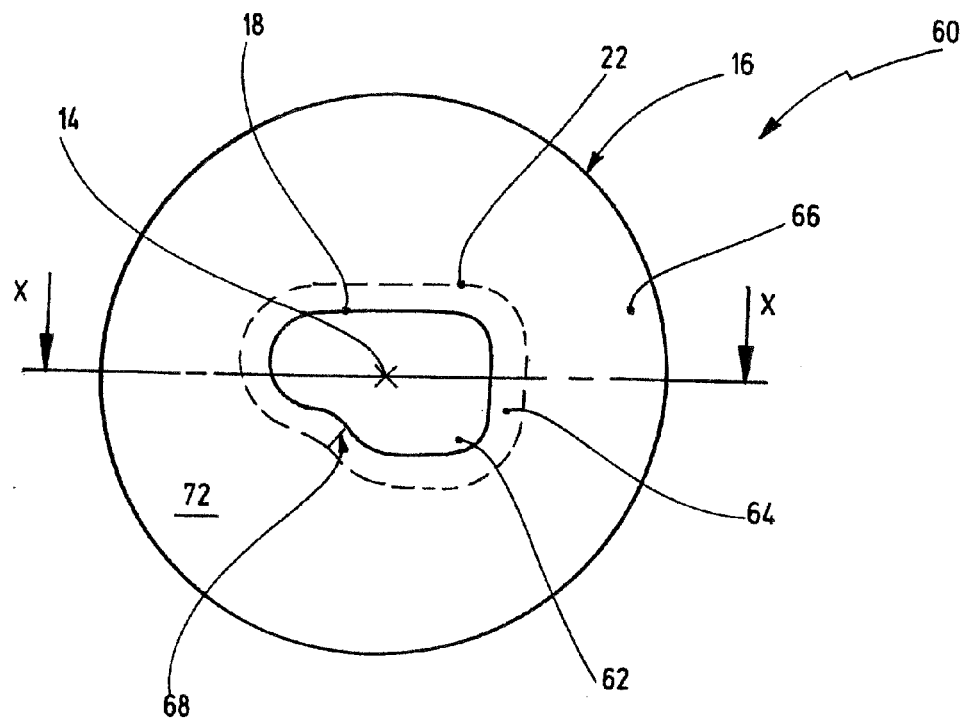
FIG. 7A shows an embodiment of an uncut lens blank.

FIG. 7A shows an uncut lens blank 60 which is then provided according to the current invention. It has a periphery or outer edge 16 which can be circular or elliptical, in the example of FIG. 7A it is circular. The carrier point can then be the geometrical center 14 as explained above. On the back surface shown in FIG. 7A, the boundary line 18 covers a preserved area 62 which is a surface area of the back surface within the boundary line 18 which has a free-form surface, that is, a surface curvature profile that has no symmetries. It is neither point nor plane nor rotationally symmetric. Further, there is a margin portion 66 surrounding the boundary line 18. In the margin portion, the extreme curvature value applies in the plane of each carrier line. In the example given in FIG. 7A, in each meridian the curvature would take an extreme value that corresponds to the preset extreme curvature value. Between the margin portion 66 and the boundary line 18, there is the transition portion 64. In the transition portion 64, the curvature transitions from the curvature of the free-form surface within the boundary line 18 towards the extreme curvature value. Transitions monotonically to the extreme curvature value means that in the case of a plus lens, the curvature continuously increases. In the case of a minus-lens, the curvature continuously decreases. In the case of a minus lens, the extreme curvature value may even be negative. A length of the transition zone may be specified in a radial direction in the example of FIG. 7A so that the extension of the transition zones takes a predefined radial length and no cutting or surfacing tool may damage the free-form surface within boundary line 18.

Figure 7B:
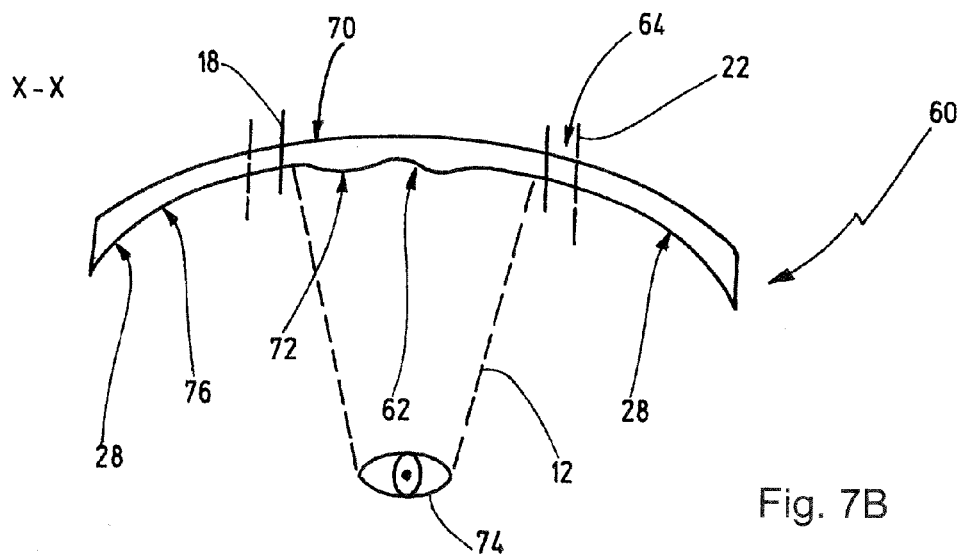
FIG. 7B shows the uncut lens blank of FIG. 7 along a section line X-X.

FIG. 7B shows a section along line X-X in FIG. 7A. A front surface of the uncut lens blank is spherical. Hence, it is rotationally symmetric with respect to the geometrical center and has a single curvature. The back surface is designated with reference numeral 72. The boundary line 18 is chosen so that the minimum eye rotation angle 12 is within the boundary line 18. The eye 74 may be determined with its center of rotation according to the norm eye used for calculations. The manufacture of the uncut lens blank has the margin portion 28 with a constant curvature 76. In the example provided in FIG. 7A and 7B, this means that in each meridian of the front surface, the tangential curvature is constant over the margin portion and takes the same value.

Figure 8A:
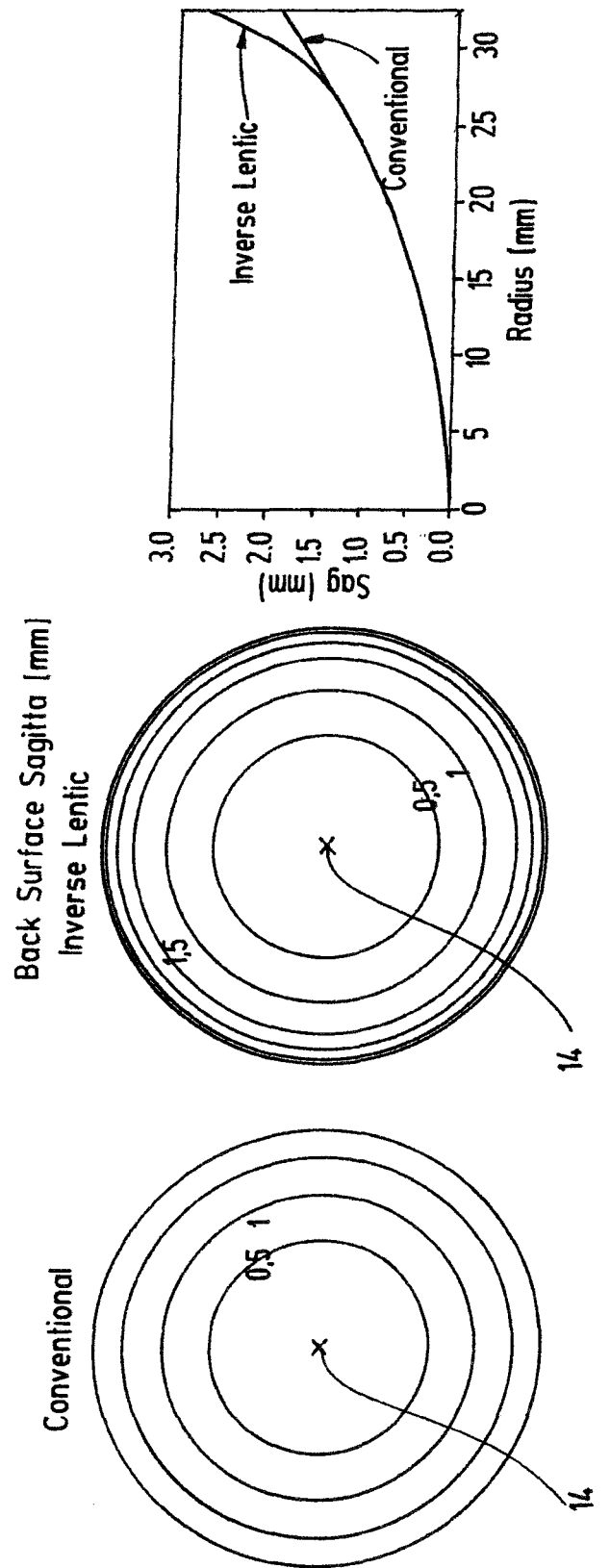
FIG. 8A shows diagrams illustrating a general example.
Figure 8B:
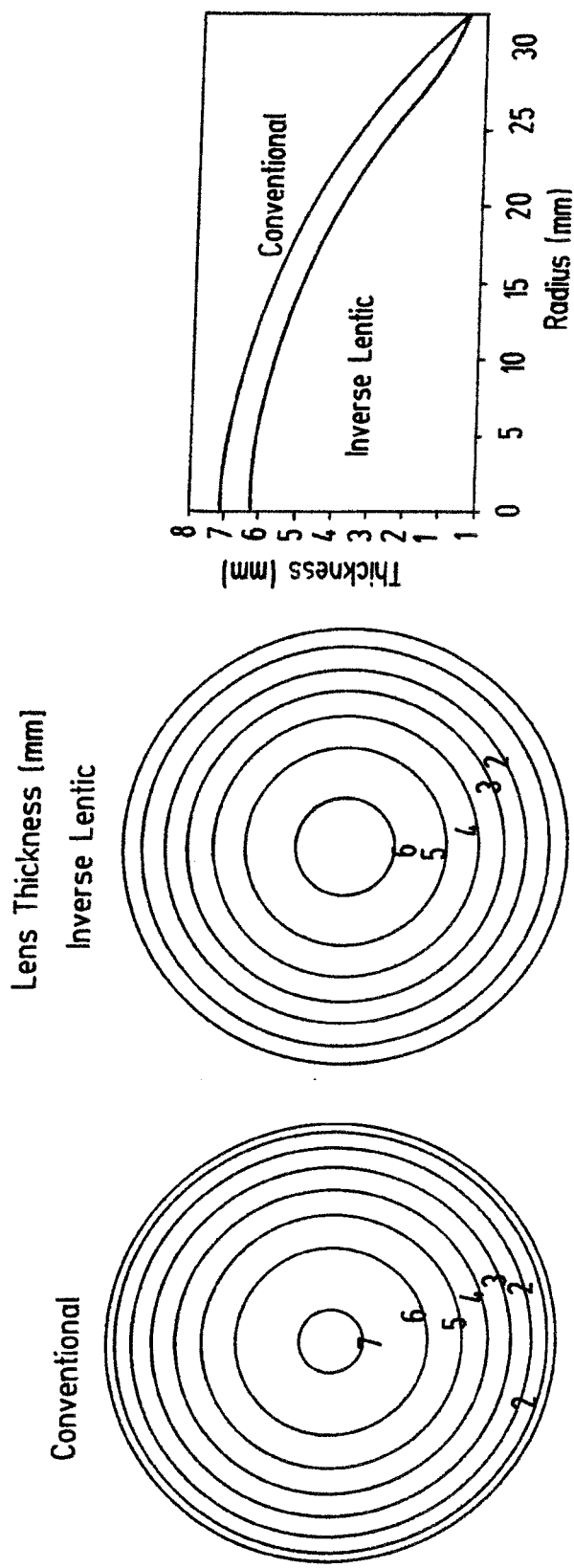
FIG. 8B shows further diagrams illustrating the general example.
Figure 8C:
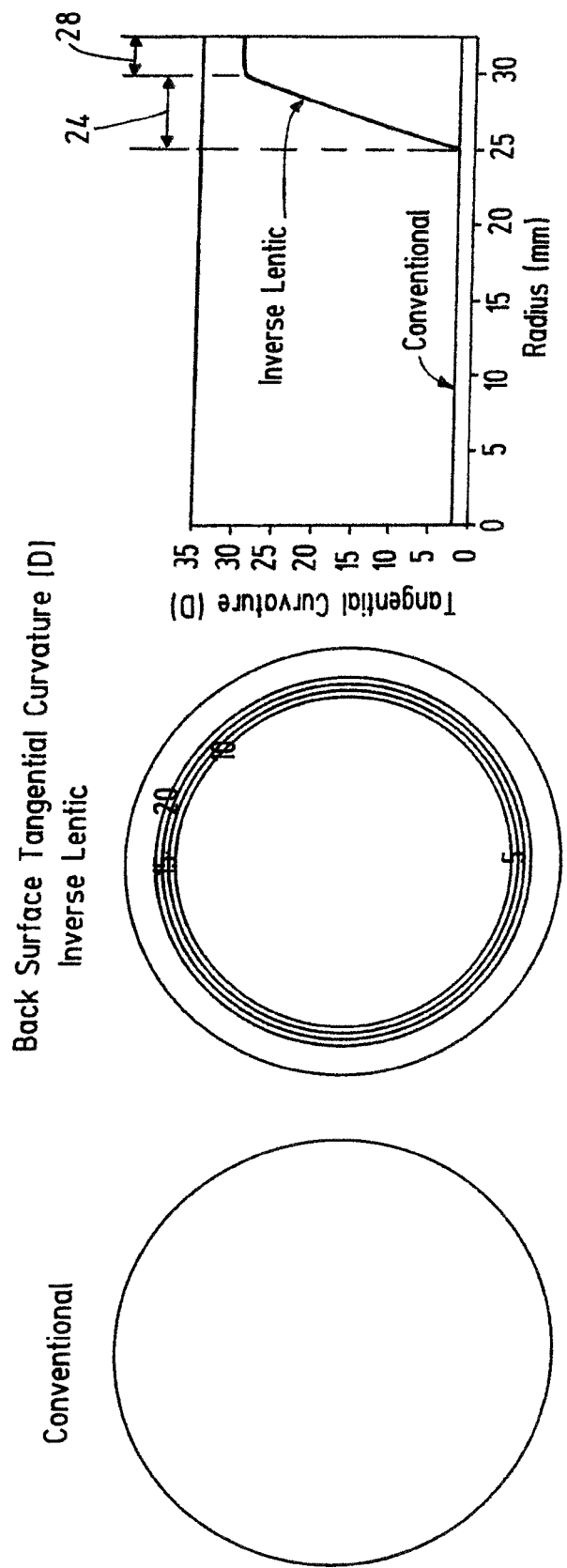
FIG. 8C shows a further diagram illustrating the general example.

In FIGS. 8A to 8C, diagrams illustrating a general example of the determination of an uncut lens blank according to the invention are provided. This example is a lens made of CR39 whose prescription is +6.00 diopters, that is, a plus lens having a positive focal power. The round uncut lens blank is 65 mm in diameter while the edged final lens shall fit inside a 50 mm diameter circle centered in the blank, which circle forms the boundary line with the lenticular portion within. Hence, the point on the back surface is the geometrical center of the uncut lens blank. Each straight line emanating from that point is a meridian. The curvature along each line is a tangential curvature. A minimum edge thickness of 0.5 mm for the 65 mm lens is required. Then, the resulting conventionally processed lens will have a center thickness of 7.097 mm and a back surface curve of 1.92 diopters, with all surface curvatures in this example as well being referenced to refractive index 1.530. In general, diopters is abbreviated by "D".

In the example, the freeform cutting tool has a radius of 17 mm. The back surface tangential curvature can therefore not be steeper than 530/17 or slightly more than 31 diopters. A maximum of 30 diopters for the design is set. A 5 mm length of the transition zone between the 1.92 D inner 50 mm diameter surface along the boundary line and the 30 D extreme curvature value further out in a margin portion results in a curvature gradient of (30-1.92)/5=5.616 D/mm in the transition zone connecting the lenticular portion and the margin portion. Using this modified back surface with the same 8 D front and 0.5 mm edge thickness brings the center thickness down to 6.295 mm.

However, the reduced center thickness within the lenticular portion also drops the back vertex power of the lens slightly to +5.97 D. A correction may be considered as needed. The correction could be accomplished in a number of ways. To be totally consistent the curvature of the inner portion of the back surface should be dropped to 1.89 D to correct for the power drop, and the gradient raised to (30-1.89)/5=5.622 D/mm. Alternatively, the sagittal heights of a 0.03 diopter sphere may be subtracted from that of the modified back surface. These changes bring the center thickness up slightly to 6.326 mm but correct for the optical powers to conform with a prescription.

The charts of FIGS. 8A to 8C compare the conventionally processed lens and the lens that includes the above described inverse lentic. FIG. 8A displays the sagitta values of the back surfaces of the two lenses; as maps of each surface and a graph comparing their sag values along one, that is, any meridian. In the center, that is, at r=0, the sag value is zero for both the conventional surface and the inverse lentic according to the invention. The modified surface diverges rapidly from the conventional surface past the boundary line at r=25 mm.

FIG. 8B is the same set of plots for the lens thickness measured in Z which is normal to the center of the surfaces. Even though the modified lens has a smaller center thickness, both lenses fulfill the specified 0.5 mm at the edge.

Then FIG. 8C displays the tangential curvature in diopters for the pair of lenses. There are no contours for the conventional lens because its back is spherical, but there is a very rapid rise in the modified lens curvature past the 25 mm boundary line until it reaches the 30 D extreme curvature value at a radius of 30 mm. The 0.03 D difference in curvature is not noticeable at the provided scale.

The following table give the values for all of the above figures:

|        | Sag (mm) | | Thickness (mm) | | Tan. Curvature (D) | |
| --- | --- | --- | --- | --- | --- | --- |
| Radius | Conv. | Inv. Lentic | Conv. | Inv. Lentic | Conv. | Inv. Lentic |
| 0 | 0.00000 | 0.00000 | 7.097 | 6.326 | 1.92 | 1.89 |
| 1 | 0.00181 | 0.00179 | 7.091 | 6.320 | 1.92 | 1.89 |
| 2 | 0.00726 | 0.00714 | 7.074 | 6.303 | 1.92 | 1.89 |
| 3 | 0.01633 | 0.01607 | 7.045 | 6.274 | 1.92 | 1.89 |
| 4 | 0.02903 | 0.02857 | 7.005 | 6.233 | 1.92 | 1.89 |
| 5 | 0.04536 | 0.04464 | 6.953 | 6.181 | 1.92 | 1.89 |
| 6 | 0.06532 | 0.06428 | 6.890 | 6.118 | 1.92 | 1.89 |
| 7 | 0.08891 | 0.08750 | 6.815 | 6.042 | 1.92 | 1.89 |
| 8 | 0.11613 | 0.11429 | 6.728 | 5.955 | 1.92 | 1.89 |
| 9 | 0.14699 | 0.14466 | 6.629 | 5.856 | 1.92 | 1.89 |
| 10 | 0.18148 | 0.17860 | 6.519 | 5.745 | 1.92 | 1.89 |
| 11 | 0.21961 | 0.21612 | 6.397 | 5.622 | 1.92 | 1.89 |
| 12 | 0.26137 | 0.25722 | 6.262 | 5.487 | 1.92 | 1.89 |
| 13 | 0.30677 | 0.30190 | 6.115 | 5.340 | 1.92 | 1.89 |
| 14 | 0.35582 | 0.35016 | 5.956 | 5.180 | 1.92 | 1.89 |
| 15 | 0.40850 | 0.40201 | 5.785 | 5.007 | 1.92 | 1.89 |
| 16 | 0.46483 | 0.45744 | 5.600 | 4.822 | 1.92 | 1.89 |
| 17 | 0.52481 | 0.51646 | 5.403 | 4.624 | 1.92 | 1.89 |
| 18 | 0.58844 | 0.57907 | 5.193 | 4.413 | 1.92 | 1.89 |
| 19 | 0.65571 | 0.64528 | 4.969 | 4.188 | 1.92 | 1.89 |
| 20 | 0.72665 | 0.71508 | 4.732 | 3.950 | 1.92 | 1.89 |
| 21 | 0.80124 | 0.78848 | 4.481 | 3.698 | 1.92 | 1.89 |
| 22 | 0.87949 | 0.86548 | 4.217 | 3.432 | 1.92 | 1.89 |
| 23 | 0.96140 | 0.94608 | 3.937 | 3.151 | 1.92 | 1.89 |
| 24 | 1.04698 | 1.03029 | 3.644 | 2.856 | 1.92 | 1.89 |
| 25 | 1.13623 | 1.11812 | 3.335 | 2.546 | 1.92 | 1.89 |
| 26 | 1.22915 | 1.21150 | 3.011 | 2.222 | 1.92 | 7.51 |
| 27 | 1.32576 | 1.32021 | 2.671 | 1.894 | 1.92 | 13.13 |
| 28 | 1.42604 | 1.45595 | 2.315 | 1.574 | 1.92 | 18.76 |
| 29 | 1.53001 | 1.63045 | 1.942 | 1.272 | 1.92 | 24.38 |
| 30 | 1.63766 | 1.85542 | 1.553 | 0.999 | 1.92 | 30.00 |
| 31 | 1.74902 | 2.14111 | 1.145 | 0.767 | 1.92 | 30.00 |
| 32 | 1.86407 | 2.49227 | 0.720 | 0.577 | 1.92 | 30.00 |
| 32.5 | 1.92298 | 2.69370 | 0.500 | 0.500 | 1.92 | 30.00 |

In FIGS. 9 to 13, figures illustrating an example for a plus lens uncut lens blank according to the invention are provided.

There are some constraints to deal with when cutting a surface on a free-form generator. One "hard" limit is the radius of the cutting tool. The standard tool is about 33 mm in radius, or about 16 diopters in curvature. A less well defined limit is the ability of the polishing to faithfully reproduce a complex surface. There are other limitations not directly related to the processing. The surface representation sent to the generator is typically a cubic spline on a rectangular grid. This grid can cause ringing or "step wise" artifacts on abrupt curved boundaries. And finally there is the wearer, who may not easily tolerate abrupt change in the optical power of the lens in those cases where the boundary is inside the frame. All of those considerations can be addressed with the two-stage adjustment to the back surface tangential curvature according to the invention; a transition zone having a curvature gradient from the curvature value at the boundary to some specified maximum (for plus lenses) or minimum (for minus lenses) curvature.

Figure 9:
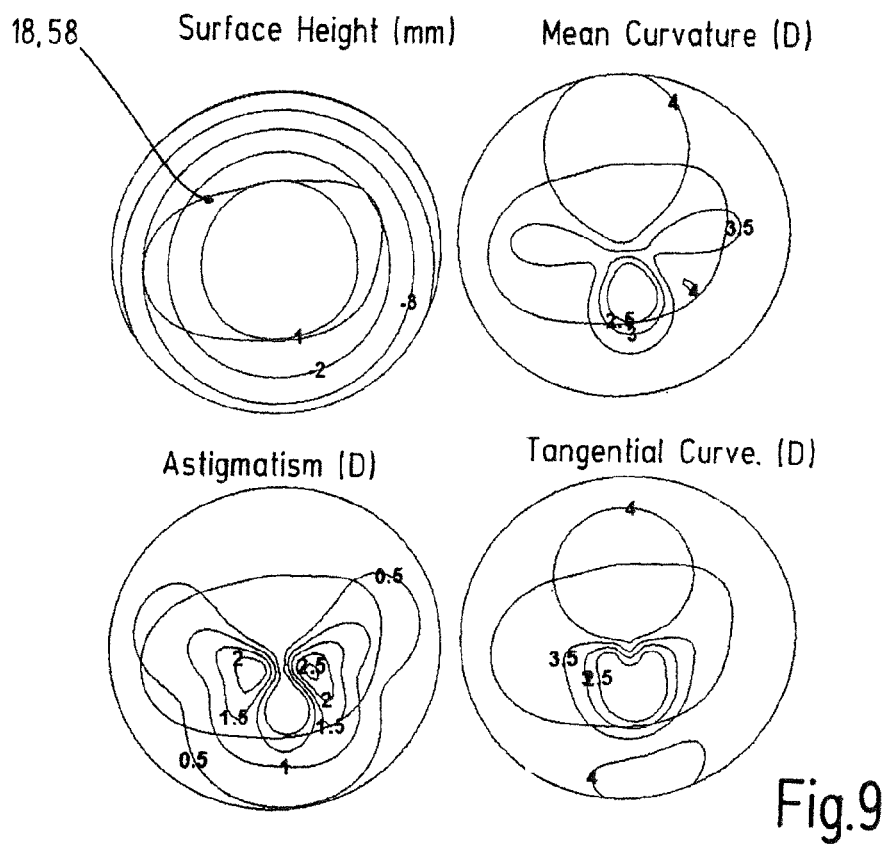
FIG. 9 shows diagrams illustrating a first example of a plus lens.

For the general positive prescription example of FIGS. 9 to 13, it is the case of a back surface progressive lens with a frame shaped boundary, separating the zone within boundary line 18 to maintain good optical properties and the exterior zone that will be glazed away. The plots in FIG. 9 show the surface height, mean curvature, astigmatism, and tangential curvature of the back surface of a lens with prescription (Rx)=+5.00 D/3.00 add, with an 8 diopter front and refractive index 1.660 of the actually used material. All curvatures in the unit "diopters" in the application are provided in 1.530 refractive index. In order to maintain a minimum edge thickness of 1 mm over the mandatory 70 mm puck diameter the center thickness of the lens must be 7.62 mm.

Figure 10:
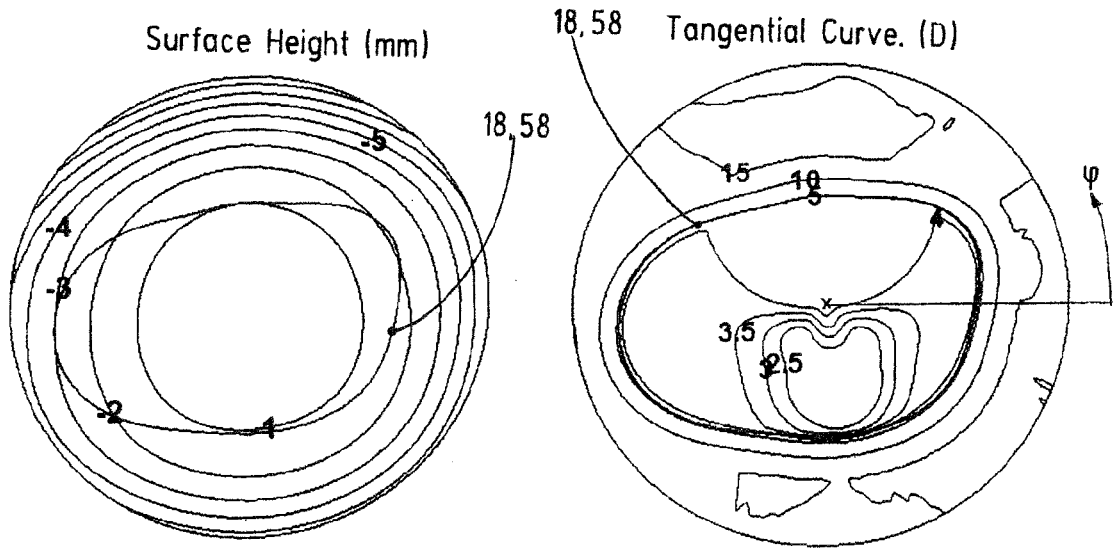
FIG. 10 shows further diagrams illustrating the example of a plus lens.

Again, the idea is to reduce the thickness of the lens by increasing the curvature of the back surface as rapidly as possible, given the constraints of the cutting and polishing. For example if the tangential curvature of the back is limited to 15 diopters, a transition zone of 5 mm is required to protect the zone inside the boundary line 18 from the cutting and polishing processes. It is mathematically possible to produce a specified tangential power everywhere outside of a convex boundary. In this case modified surface was calculated using a least-squares optimization program, specifying the surface heights or the curvature profile inside the boundary line, and the tangential power outside the boundary line. The surface heights and tangential curvature of the modified surface are shown in FIG. 10.

Figure 11:
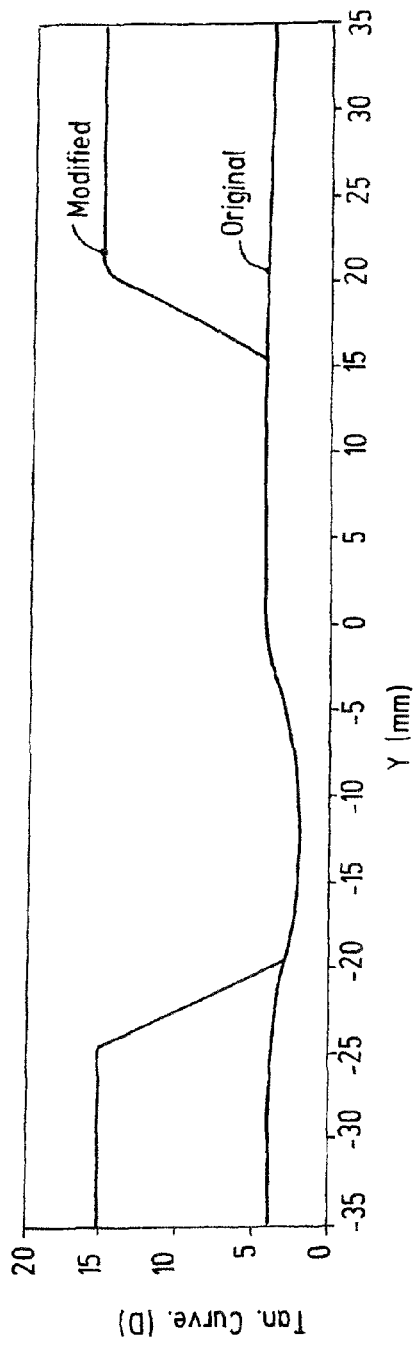
FIG. 11 shows a further diagram illustrating the example of a plus lens.

The graph in FIG. 11 plots the tangential curvatures of the original and modified surfaces along the vertical meridian, just to emphasize the two-stage nature of the modified tangential curvature outside of the boundary line 18.

Figure 12:
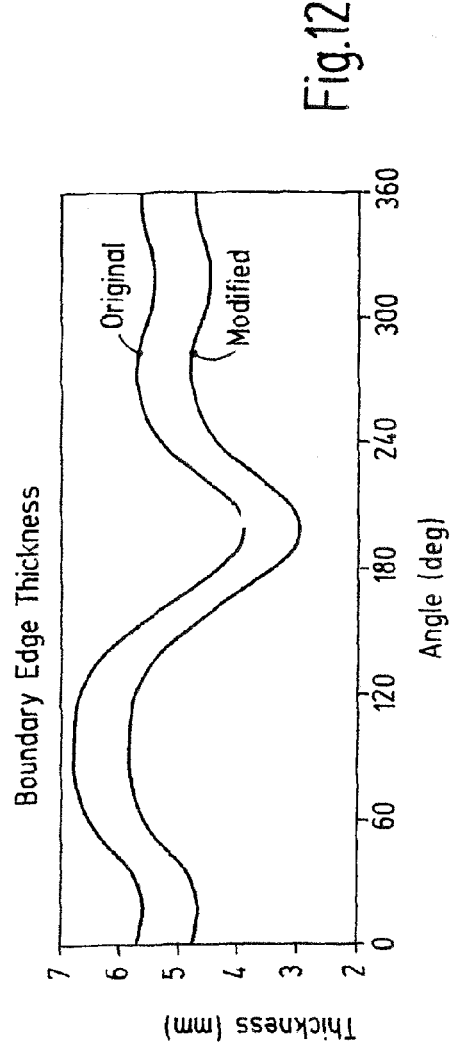
FIG. 12 shows yet a further example illustrating the embodiment of a plus lens.
Figure 13:
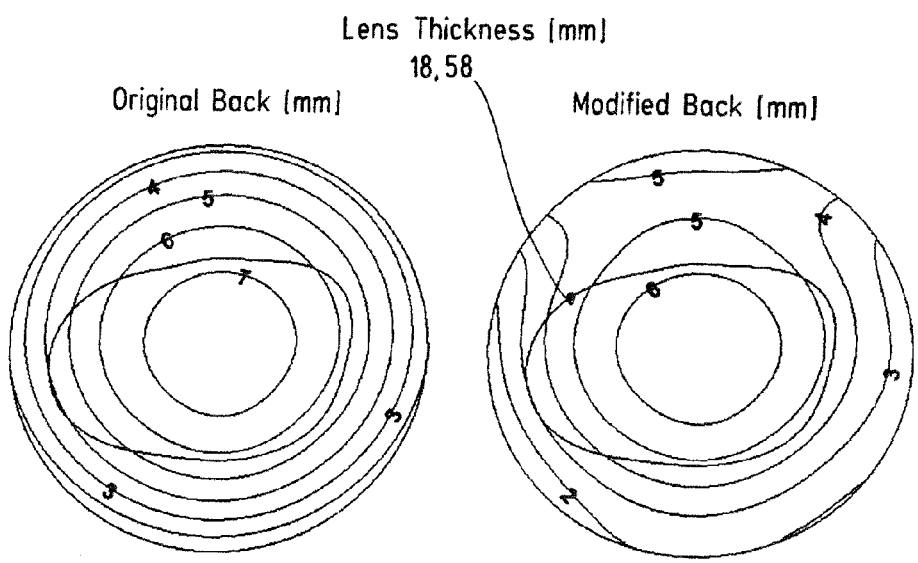
FIG. 13 shows a further diagram illustrating the effects of the method in the example of a plus lens.

Using the modified back surface shape, the original front surface shape and adjusting the power of the back surface to compensate the prescription for the change in thickness in further subsequent optimization, this gives a center thickness of 6.69 mm applying the same 1 mm minimum edge thickness, for a reduction of 0.93 mm. Maps of the thickness over the full round 70 mm puck and a graph of the thickness around the boundary line are shown in FIGS. 12 and 13.

In general the boundary line 18 may not represent the outline of the final cut-out or frame line 58. The boundary line 18 may be larger than the frame shape to allow for a greater buffer for the optical zone. Alternatively, part or all of the boundary line might lie inside the frame zone or frame line, trading off some distortion in the periphery for a reduction in thickness, particularly for minus powered lenses.

Figure 14:
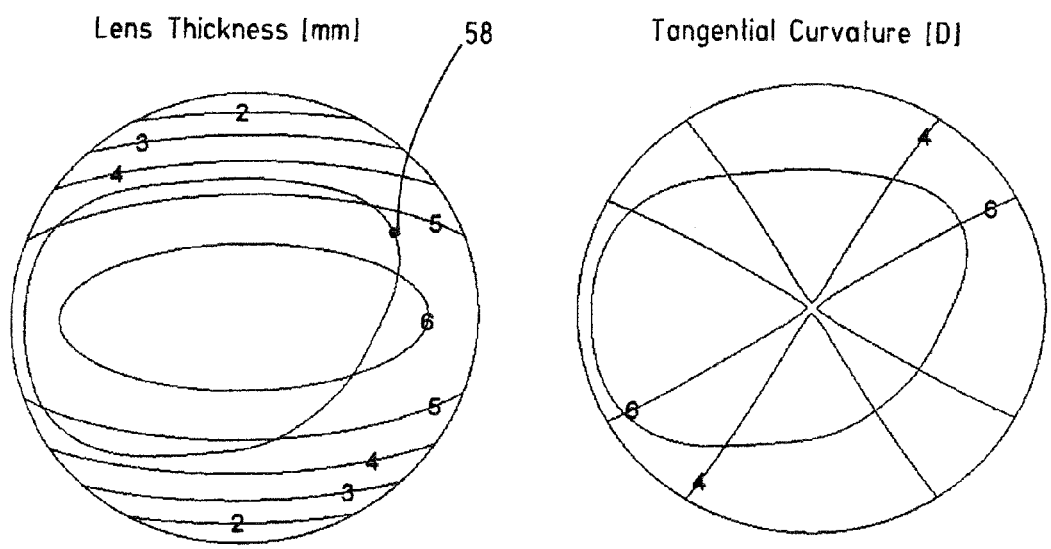
FIG. 14 shows diagrams illustrating a second example of a cribbed plus lens.
Figure 15:
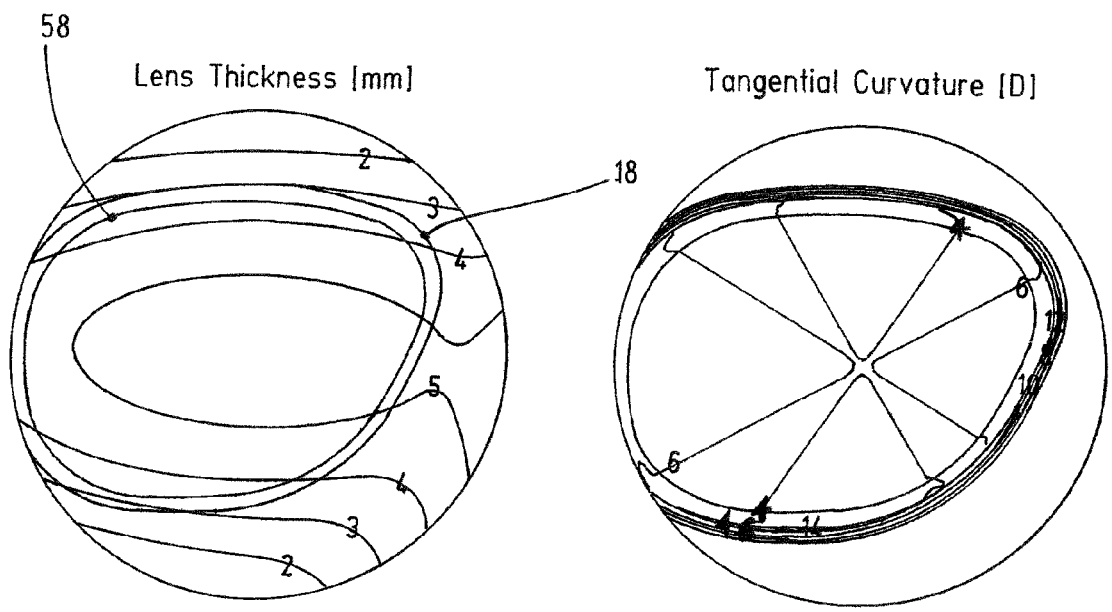
FIG. 15 shows further diagrams illustrating the effects of the method in the example of the cribbed plus lens.
Figure 16:
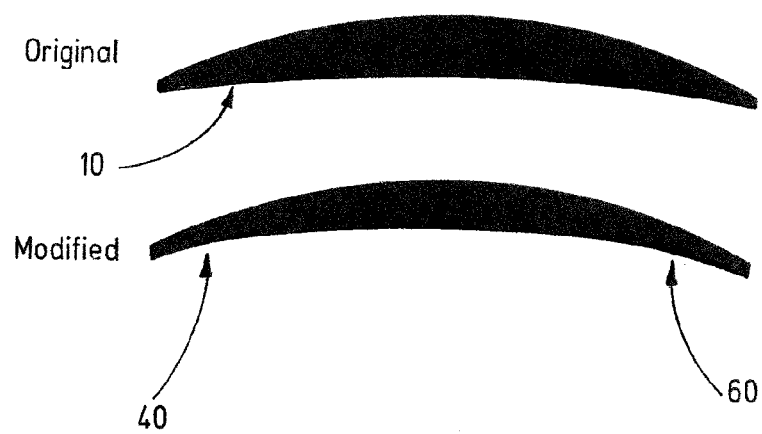
FIG. 16 shows the result of the method in the example of a cribbed plus lens.

In FIGS. 14 to 16, the next example is of a single vision lens with prescription (Rx) of +5 sphere/−4 cyl at 90 degrees (hence, vertical). In this case, we will assume the 8 D, index 1.499 puck is cribbed to a 65 mm diameter, just a couple of millimeters past the temporal edge of the frame, outlined with frame line 58 in FIG. 14. The back is cut such that the minimum edge thickness is kept above 1 mm. Because of the orientation of the high cyl that minimum occurs at the top and bottom of the puck leaving the center 6.54 mm thick.

The plots in FIG. 15 show the result after the modification. The line 18 shows the boundary inside which the original surface is preserved. In this case the boundary line 18 lies entirely outside of the frame line 58, and falls outside of the puck on the extreme temporal side. A 2 mm wide transition zone was used, with the tangential curvature rising to 15 diopters (abbreviated with "D" throughout the application) past the transition zone. With the same 1 mm thickness at the top of this puck the center thickness, after adjusting the curvature to restore the prescription, is now 5.51 mm, for a reduction of 1.03 mm. The picture in FIG. 16 shows the cross section of the full 65 mm puck along the 90 degree meridian.

Figure 17:
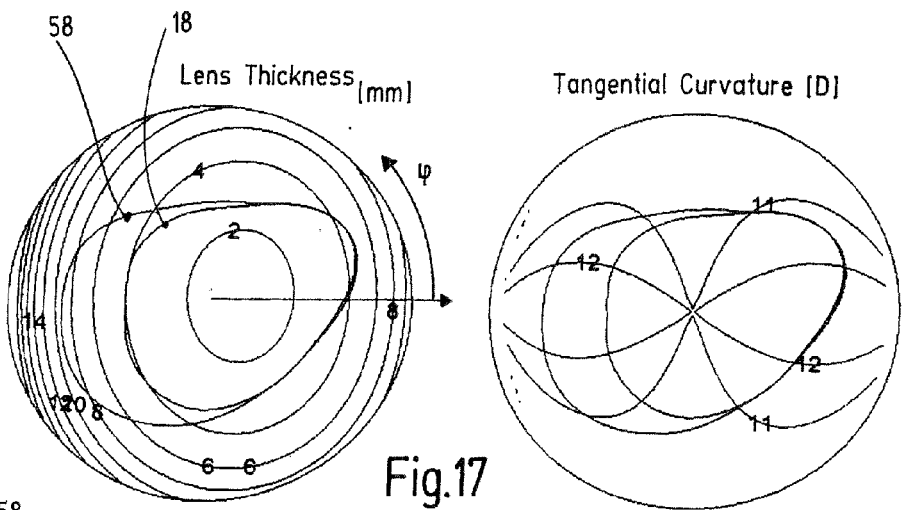
FIG. 17 shows diagrams illustrating an example of a minus lens.
Figure 18:
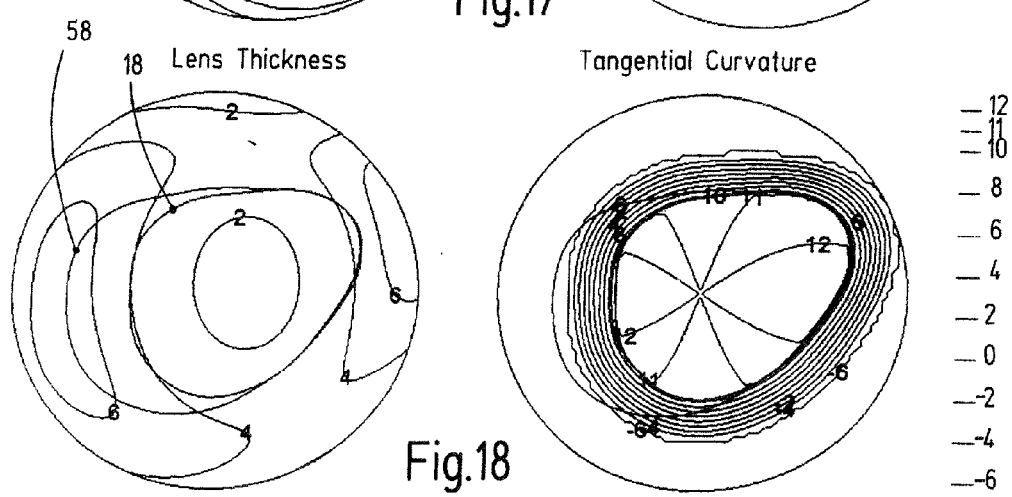
FIG. 18 shows further diagrams illustrating the example of a minus lens.
Figure 19:
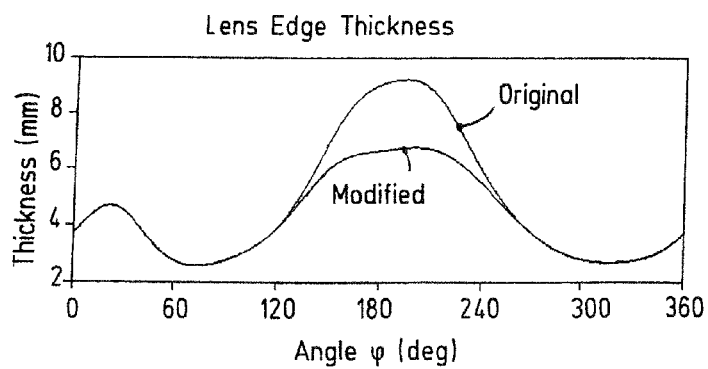
FIG. 19 shows the effect of the method and example of a minus lens.

The example in FIGS. 17 to 19 is for minus lenses. Reducing the edge thickness requires reducing the curvature of the back surface beyond the boundary, so the curvature of the cutting tool is not a constraint. Still, the same two-stage strategy applies. In this example, the magnitude of the tangential power gradient is limited rather than having a constant length for the transition zone. The gradient might be determined by wearers' tolerance for distortion in the periphery, for example. The final constant tangential curvature can be negative (convex), determined from aesthetics, and in some cases may not be reached by the edge of the puck.

The pair of plots in FIG. 17 shows the lens thickness and tangential curvature for a large wrapped de-centered sport lens. The 80 mm polycarbonate puck has an 8 diopter front. The prescription is −3 sphere with a −2 cyl at 90 degrees (vertical), with 15 degrees of frame wrap.

The line 58 shows the edge of the frame, while boundary line 18 shows the outline of a boundary selected for edge thickness reduction. This boundary was chosen to give the optically preserved section of the lens the appearance of a smaller, similarly shaped lens to the full lens. The maximum edge thickness of the lens would be 9.2 mm without modification.

In the following example a tangential curvature gradient of 2 D/mm was applied past the specified boundary 18, and the back surface curvature was limited to −6 D convex. The result is shown in FIG. 18. The maximum edge thickness of the lens using the modified back is reduced to 6.75 mm as shown in FIG. 19.

Figure 20:
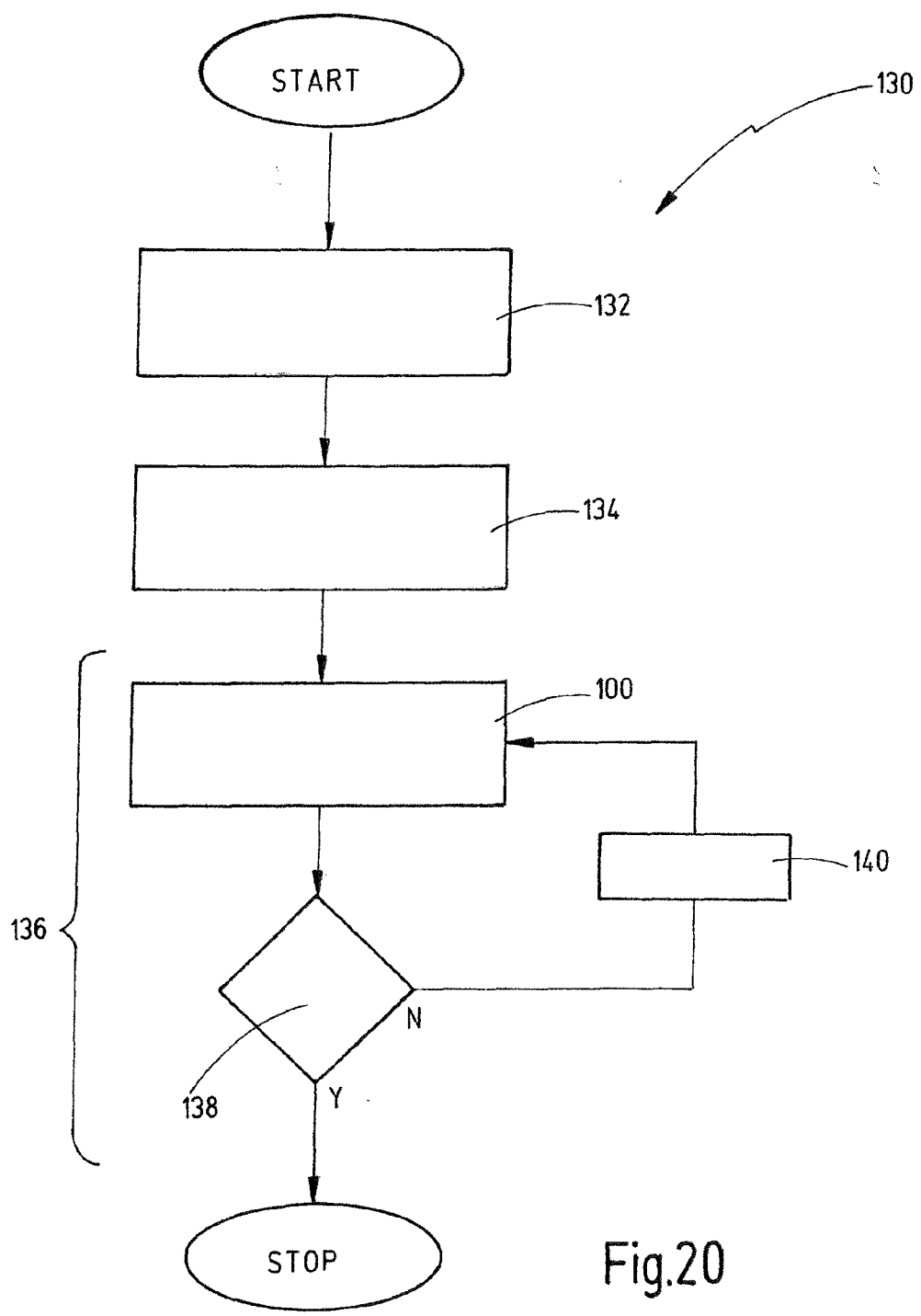
FIG. 20 shows an embodiment of a method according to the second aspect of the invention.

FIG. 20 shows an embodiment of a method 130, in particular which may also be a computer implemented method, for reducing a thickness of an original lens shape of an uncut lens blank, in particular through the use of a non-transitory computer-readable medium. After the method has started, again, the original lens shape of an uncut lens blank is provided, wherein the original lens shape comprises an original lens shape of a front surface and a back surface of the uncut lens blank, in particular a shape according to a prescription.

Then, in step 134, certain parameters, namely a set of parameters is specified including a recommended maximum magnitude of a curvature gradient of the back surface, a hard limit maximum magnitude of a curvature gradient of the back surface which is larger than the recommended maximum magnitude, a recommended extreme curvature value, a minimum value for an eye rotation angle, a recommended value for the eye rotation angle, a frame line on the back surface along which a final lens is to be cut out of the uncut lens blank, a maximum lens thickness along the frame line, and a boundary line, in particular within which the original shape of the back surface is to be preserved.

Then, the method as described above in connection with FIG. 1 and according to the first aspect of the invention is conducted. This method is repeatedly conducted, once in each iteration in step 136. A maximum thickness along the frame line is determined after each determination of the modified lens shape and compared to the specified maximum lens thickness. In case the maximum lens thickness along the frame of the modified lens shape should be equal or below the specified maximum thickness, step 138 of comparison would turn out a "yes" and the method could stop. If not, in step 140, the parameters along which method 100 is conducted are amended. In particular, at least one of the maximum magnitude curvature gradient of the back surface, the boundary line 18 and the predefined curvature value may be modified. In particular, for these amendments, a specific sequence of amendments is provided according to the following. These sequences are followed as laid out in step 138; the comparison turns out the "no".

First, the recommended maximum magnitude of the curvature gradient and the recommended extreme curvature value are applied. Then, the boundary line on the back surface is decreased from an initial shape which is at least partly identical to the frame line towards a shape enclosing a back surface area only covering at least the recommended eye rotation angle. The boundary line is decreased until it hits the recommended eye rotation angle surface area in at least one point. As the shape of the boundary line may take any shape and the surface area covered by the eye rotation angle is essentially a circle, the boundary line may still cover larger eye rotation angles in other meridians. Hence, it "at least" covers the recommended eye rotation angle. However, in one radial direction or in one meridian, it is identical to the recommended eye rotation angle.

If this should not be sufficient, the magnitude of the maximum curvature gradient is increased from the recommended maximum magnitude towards the hard limit maximum magnitude.

If this should still not be sufficient, the boundary line is further decreased from a shape enclosing the back surface area covering at least the recommended eye rotation angle towards a shape enclosing a back surface area covering at least the minimum eye rotation angle.

Last, if this should still not be sufficient, the extreme curvature value which was kept constant at the recommended value before, could be raised toward the hard limit. However, then, a warning should be returned to the user.

Figure 21:
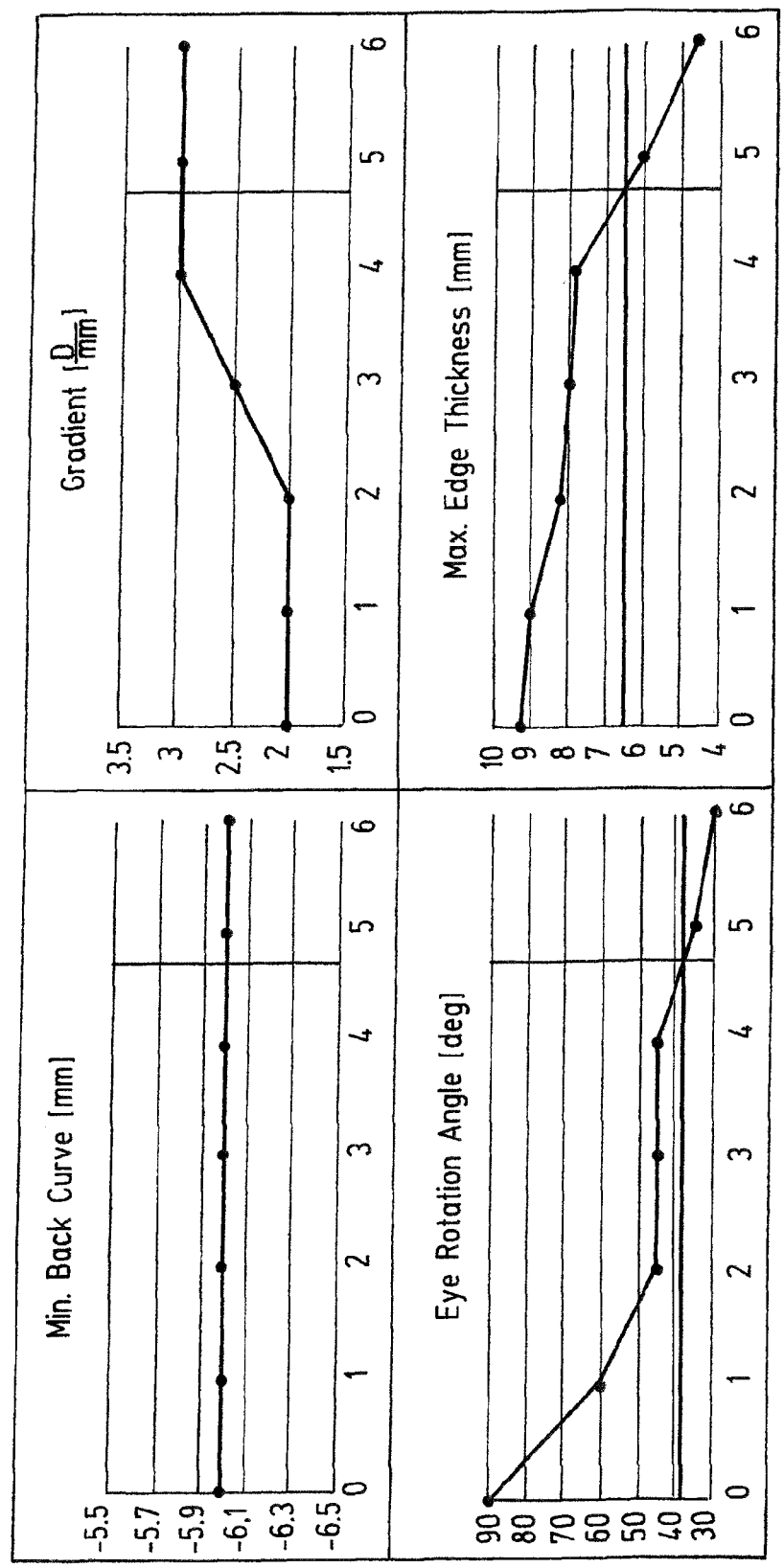
FIG. 21 shows a diagram illustrating the set of parameters in various saturation steps of the method according to FIG. 20.
Figure 22:
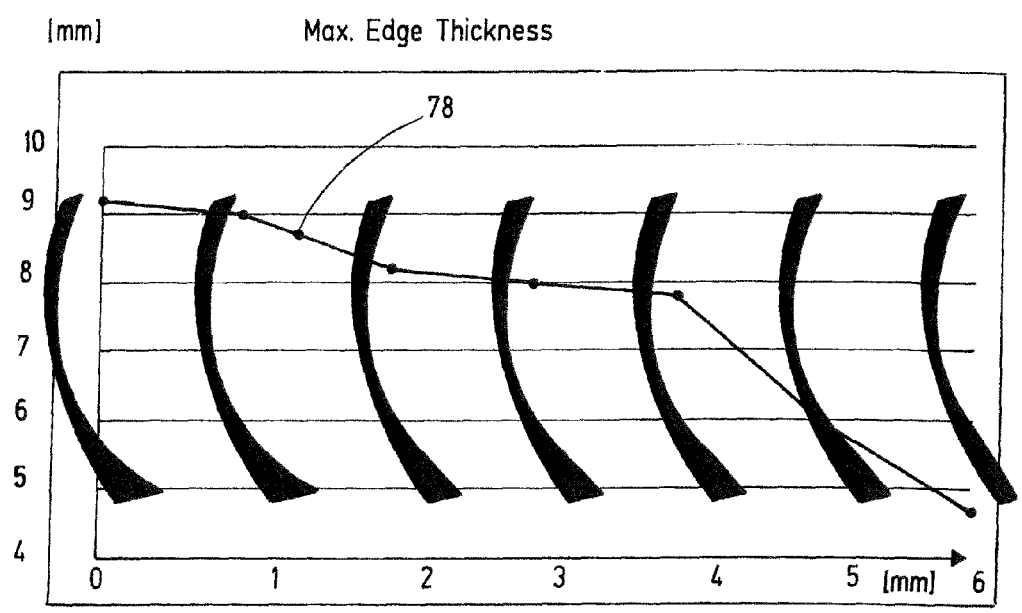
FIG. 22 shows the different results of the example of the method according to the second aspect.
Figure 23:
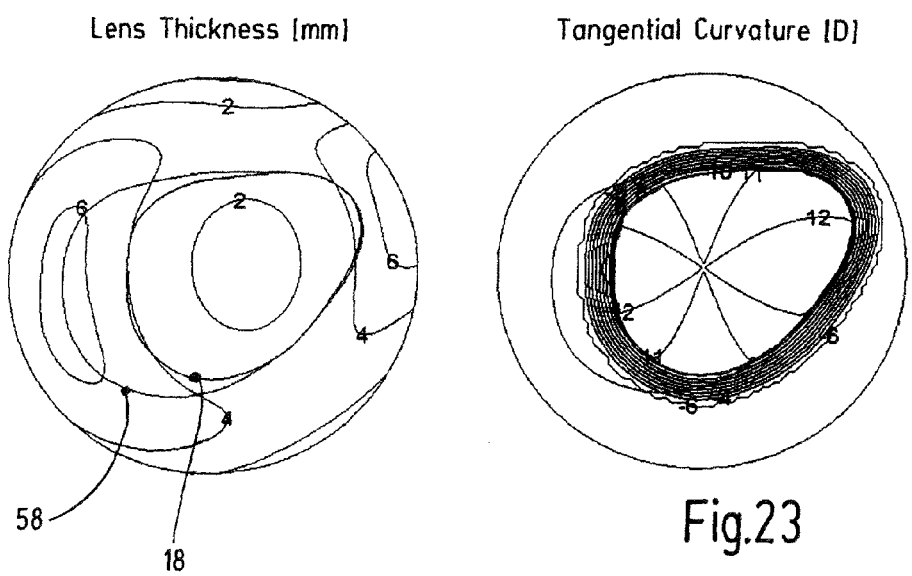
FIG. 23 shows further diagrams illustrating the example of the method according to the second aspect.

This method is further explained along the example of FIGS. 21 to 23.

There are three main parameters that control the reduction in edge thickness: the gradient, the extreme allowed back curve (maximum for inverse lentic for plus lens, minimum for carrier curve for minus lens), and the minimum eye rotation angle represented by the boundary. In the example of FIGS. 17 to 19 which is used for the further explanation, the optically preserved zone is about 40 degrees of eye rotation to the temporal side of the fitting cross. It may be desirable to allow the maximum edge thickness of the lens to be specified. In general that can be achieved by adjusting all three of the mentioned parameters. The following example describes one of the many ways in which the parameters may be determined from a specified maximum edge thickness.

For each of the three parameters assume there is a recommended value plus a hard limit. In this example, the recommended gradient is set as 2 D per mm with a maximum limited to 3 D per mm, a minimum back curvature of −6 D as both the recommended and hard limit, and a recommended eye rotation angle of the boundary of 45 degrees with the minimum limited to 35 degrees. To satisfy an edge thickness request the parameters might be modified in the following sequence: 1) set the recommended gradient and curvature minimum and reduce the boundary size from the frame size to the recommended boundary size; 2) increase the gradient from the recommended to the maximum; 3) decrease the boundary from the recommended to the minimum; and, 4) if the specified maximum edge thickness is still not achieved, use the hard limit values and return a warning.

For the above lens the following curves show the parameters and the maximum edge thickness for seven sampled cases of the above sequence in FIG. 21.

The next FIG. 22 is an overlay of lens cross sections on top of the maximal edge thickness graph, just to examine the relationship between the numbers and the lenses. The cross-sections are along the 20 degree meridian, approximately the widest and thickest part of the lens.

In the next example, the lens order specifies a maximum edge thickness of 6.5 mm. That level is represented by the horizontal red line in the first maximal edge thickness graph. A simple interpolation of that function gives an approximate value of 37.9 degrees eye rotation associated with that edge thickness, the location of the vertical lines. The other parameters associated with that angle are just the maximum gradient of 3 D/mm and the minimum back curvature of −6 diopters. The Lens Thickness and Tangential Curvature using a boundary with that temporal extent along with the other parameters are plotted in FIG. 23. The combination produces a lens with center thickness of 6.49 mm. If that is not close enough to 6.50 then an iteration could be performed.

Figure 24:
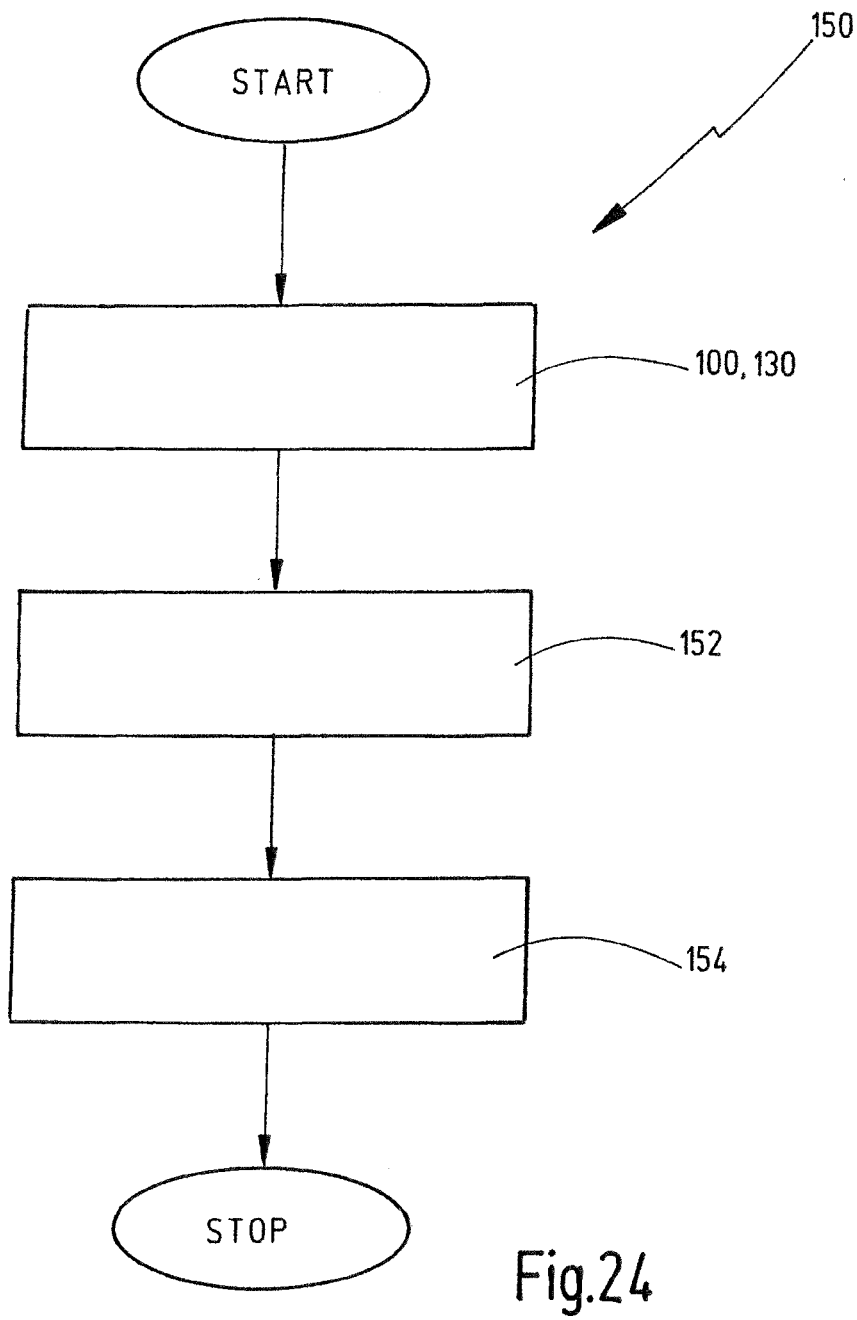
FIG. 24 shows a block diagram of a manufacturing method according to a third aspect of the invention.

Finally, FIG. 24 shows a method for manufacturing generally designated by reference numeral 150. After the start, a method 100 according to the first aspect and/or a method 130 according to the second aspect is conducted. Afterwards, based on the modified lens shape, a manufacturing step 152 would take place that manufactures the uncut lens blank 60. Subsequently, the uncut lens blank 60 would be forwarded to step 154 and could be further processed. Step 154 could include in particular an edging process that cuts the lens out of the uncut lens blank towards its final shape that in particular may then be shipped towards an ophthalmic dispenser.

The method then ends.

In particular, the current invention may comprise embodiments according to the following clauses:

Clause 1: A computer-implemented method (100) for providing a modified lens shape (40) for an uncut lens blank (60) comprising the following steps:
 a) providing (102) an original lens shape (10) of an uncut lens blank (60) having a front surface (70) and a back surface (72), wherein the original lens shape (10) comprises an original shape of the front surface (70) and an original shape of the back surface (72) of the uncut lens blank (60), such that the uncut lens blank (60) satisfies predetermined optical properties,
 b) determining (104) a boundary line (18) on the back surface (72), wherein a curvature profile of the original shape of the back surface (72) is to be preserved within the boundary line (18);
 c) determining (106) a boundary curvature of the back surface (72) at the boundary line (18);
 d) determining (108) a new curvature profile (38) of the back surface (72) between the boundary line (18) and an outer edge (16) of the uncut lens blank (60), wherein a curvature of the new curvature profile (38) at the boundary line (18) equals the boundary curvature and transitions monotonically and continuously towards the outer edge (16) from the boundary curvature towards a predefined curvature value;
 e) determining (110) a modified lens shape (40) of the uncut lens blank (60), wherein the modified lens shape (40) comprises the original shape of the front surface (70), and a modified shape of the back surface (72), wherein the modified shape of the back surface (72) is determined by an optimization procedure based on the new curvature profile towards a target shape, and wherein the target shape includes the preserved curvature profile of the original lens shape (10) within the boundary line (18) and a thickness requirement for the outer edge (16) of the uncut lens blank (60).

Clause 2: The method according to clause 1, characterized in that the original lens shape (10) provides for a positive focal power, wherein the predefined curvature value is a maximum curvature value, and wherein, as the thickness requirement, a predefined value for a smallest thickness of the outer edge (16) of the uncut lens blank (60) is applied as a mandatory condition.

Clause 3: The method according to clause 2, characterized in that the mandatory condition is applied so that, during the optimization process, a sagittal height of the preserved curvature profile of the original lens shape (10) of the back surface (72) within the boundary line (18) is adjusted while the preserved curvature profile is maintained.

Clause 4: The method according to clause 2 or 3, characterized in that a second optimization is conducted subsequent to step e), wherein the further optimization uses the modified shape of the back surface (72) as an initial shape and optimizes only the curvature profile within the boundary line (18) towards the predefined optical properties of the original lens shape (10).

Clause 5: The method according to clause 1, characterized in that the original lens shape (10) provides for a negative focal power, wherein the predefined curvature value is a minimum curvature value, and wherein, as the thickness requirement, a sagittal height of the fixed curvature profile of the original lens shape (10) of the back surface (72)

within the boundary line (18) is fixed, and wherein a minimum thickness of the outer edge (16) is applied as a mandatory boundary condition during the optimization process.

Clause 6: The method according to any of clauses 1 to 5, characterized in that the method further comprises defining a transition zone (24) adjacent to the boundary line (18) towards the outer edge (16) in which transition zone (24) the curvature transitions monotonically from the boundary curvature to the predefined curvature value towards the outer edge (16) of the uncut lens blank (60), and wherein the transition zone (24) is set as a minimum length.

Clause 7: The method according to any of clauses 1 to 6, characterized in that the method further comprises defining a transition zone (24) adjacent to the boundary line (18) towards the outer edge (16) of the uncut lens blank (60) in which transition zone (24) the curvature transitions monotonically from the boundary curvature to the predefined curvature value towards the outer edge (16), and wherein the transition zone (24) is set by defining a maximum magnitude for a gradient of the curvature.

Clause 8: The method according to any of clauses 1 to 7, characterized in that a shape of a frame into which a final lens is to be inserted is provided, wherein a frame line (58) is defined by a line along which the uncut lens blank (60) is to be cut to fit into the frame, and wherein a shape of the boundary line (18) corresponds to a shape of the frame line (58).

Clause 9: The method according to any of clauses 1 to 8, characterized in that the curvature of the back surface (72) is continuous.

Clause 10: The method according to any of clauses 1 to 9, characterized in that the uncut lens blank (60) is a unitary element made of a single material.

Clause 11: A computer-implemented method (130) for reducing a thickness of an original lens shape (10) of an uncut lens blank (60), in particular through the use of a non-transitory computer readable medium, comprising the following steps:
  A) providing (132) an original lens shape (10) of an uncut lens blank (60), wherein the original lens shape (10) comprises an original shape of a front surface (70) and a back surface (72) of the uncut lens blank (60), such that the uncut lens blank (60) satisfies predetermined optical properties;
  B) specifying (134) a set of parameters including a recommended maximum magnitude of a curvature gradient of the back surface (72), a hard-limit maximum magnitude of a curvature gradient of the back surface (72) which is larger than the recommended maximum magnitude, a recommended predefined curvature value, a minimum value for an eye rotation angle (12), a recommended value for the eye rotation angle (12), a frame line (58) on the back surface (72) along which a final lens is to be cut out of the uncut lens blank (60), a maximum lens thickness along the frame line (58), and a boundary line (18) within which the original shape of the back surface (72) is to be preserved;
  C) iteratively (136) conducting the method for providing a modified lens shape (40) according to any of clauses 1 to 10 based on the set of parameters, to provide for a modified lens shape (40) until a lens thickness along the frame line (58) of the modified lens shape (40) is equal to or below the specified maximum lens thickness, and wherein, during iteration, at least one of the maximum magnitude curvature gradient of the back surface, the boundary line (18) and the predefined curvature value is modified.

Clause 12: The method according to clause 11, characterized in that, during the iteration (136) in step C), the set of parameters is modified (140) according to the following sequence:
  I. applying the recommended maximum magnitude of the curvature gradient and the recommended predefined curvature value, and decreasing the boundary line (18) from an initial shape being at least partly identical to the frame line (58) towards a shape enclosing a back surface (72) area covering at least the recommended eye rotation angle (12),
  II. increasing the magnitude of the maximum curvature gradient from the recommended maximum magnitude towards the hard-limit maximum magnitude;
  III. decreasing the boundary line (18) from a shape enclosing the back surface (72) area covering at least the recommended eye rotation angle (12) towards a shape enclosing a back surface (72) area covering at least the minimum eye rotation angle (12).

Clause 13: The method according to clause 11 or 12, characterized in that step C) further comprises specifying a hard-limit predefined curvature value which has a larger magnitude than the recommended predefined curvature value, and wherein, subsequent to sequence step III., the hard-limit predefined curvature value is applied as the predefined curvature value during optimization.

Clause 14: A method (150) for manufacturing a lens, comprising the steps of providing (100, 130) a modified lens shape (40) for an uncut lens blank (60) according to any of clauses 1 to 13, and manufacturing (152) the uncut lens blank (60) according to the modified lens shape (40).

Clause 15: An uncut lens blank (60) for manufacturing a spectacle lens, comprising a front surface (70) and a back surface (72), wherein the front surface (70) is a convex rotationally symmetric surface, and wherein the back surface (72) comprises a lenticular portion (62), a margin portion (28) and a transition portion (24) located between the lenticular portion (62) and the margin portion (28), and wherein a curvature of the back surface (72) along a straight line (30-37) emanating from a point (14) on the back surface (72) takes an extreme curvature value over the complete margin portion (28) and transitions monotonically towards the extreme curvature value through the transition portion (24), and wherein the curvature of the back surface (72) along the straight line (30-37) is continuous.

Clause 16: An uncut lens blank (60) for manufacturing a spectacle lens, comprising a front surface (70) and a back surface (72), wherein the front surface (70) is a convex rotationally symmetric surface, and wherein the back surface (72) comprises a lenticular portion (62) which is asymmetric, a margin portion (28) and a transition portion (24) located between the lenticular portion (62) and the margin portion (28), and wherein a curvature of the back surface (72) along a straight line (30-37) emanating from a point (14) on the back surface (72) transitions monotonically towards an extreme curvature value through the transition portion (24), and wherein the curvature of the back surface (72) along the straight line (30-37) is continuous.

Clause 17: The uncut lens blank of clause 15 or 16, characterized in that the extreme curvature value is a smallest curvature of the back surface (72) along the straight line (30-37) or in that the extreme curvature value is a largest curvature of the back surface (72) along the straight line (30-37).

Clause 18: The uncut lens blank of any of clauses 15 to 17, characterized in that the transition portion (24) completely surrounds the lenticular portion (62).

Clause 19: The uncut lens blank of any of clauses 15 to 18, characterized in that the margin portion (28) extends up to an outer edge (16) of the uncut lens blank (60) along the straight line (30-37), and wherein the margin portion (28) circumferentially extends along at least a part of the outer edge (16) of the uncut lens blank (10).

Clause 20: The uncut lens blank according to clause 19, characterized in that the margin portion (28) circumferentially extends along the complete outer edge (16) of the uncut lens blank (10).

Clause 21: A computer program product comprising program code means for carrying out the steps of a method according to any of clauses 1 to 14.

Clause 22: A machine readable storage medium having stored thereon a computer program comprising program code means for carrying out the steps of a method according to any of clauses 1 to 14.

It is understood that the foregoing description is that of the preferred embodiments of the invention and that various changes and modifications may be made thereto without departing from the spirit and scope of the invention as defined in the appended claims.

What is claimed is:

1. A computer-implemented method for providing a modified lens shape for an uncut lens blank comprising the following steps:
    a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;
    b) determining a boundary line on the back surface, wherein a curvature profile of the original shape of the back surface is to be preserved within the boundary line;
    c) determining a boundary curvature of the back surface at the boundary line;
    d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value; and,
    e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank; and,
    f) manufacturing the uncut lens blank according to the modified lens shape.

2. The method according to claim 1, wherein the curvature of the back surface is continuous.

3. The method according to claim 1, wherein the uncut lens blank is a unitary element made of a single material.

4. The method according to claim 1, wherein the original lens shape provides for a positive focal power, wherein the predefined curvature value is a predetermined upper threshold curvature value, and wherein, as the thickness requirement, a predefined value for a smallest thickness of the outer edge of the uncut lens blank is applied as a mandatory condition.

5. A computer-implemented method for providing a modified lens shape for an uncut lens blank comprising the following steps:
    a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;
    b) determining a boundary line on the back surface, wherein a curvature profile of the original shape of the back surface is to be preserved within the boundary line;
    c) determining a boundary curvature of the back surface at the boundary line;
    d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value; and,
    e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank;
    wherein the original lens shape provides for a positive focal power, wherein the predefined curvature value is a predetermined upper threshold curvature value, and wherein, as the thickness requirement, a predefined value for a smallest thickness of the outer edge of the uncut lens blank is applied as a mandatory condition; and,
    wherein the mandatory condition is applied so that, during the optimization process, a sagittal height of the preserved curvature profile of the original lens shape of the back surface within the boundary line is adjusted while the preserved curvature profile is maintained; and,
    f) manufacturing the uncut lens blank according to the modified lens shape.

6. A computer-implemented method for providing a modified lens shape for an uncut lens blank comprising the following steps:
    a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;
    b) determining a boundary line on the back surface, wherein a curvature profile of the original shape of the back surface is to be preserved within the boundary line;

c) determining a boundary curvature of the back surface at the boundary line;
d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value; and,
e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank;
wherein the original lens shape provides for a positive focal power, wherein the predefined curvature value is a predetermined upper threshold curvature value, and wherein, as the thickness requirement, a predefined value for a smallest thickness of the outer edge of the uncut lens blank is applied as a mandatory condition; and,
wherein a second optimization is conducted subsequent to step e), wherein the second optimization uses the modified shape of the back surface as an initial shape and optimizes only the curvature profile within the boundary line towards the predetermined optical properties of the uncut lens blank; and,
f) manufacturing the uncut lens blank according to the modified lens shape.

7. A computer-implemented method for providing a modified lens shape for an uncut lens blank comprising the following steps:
a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;
b) determining a boundary line on the back surface, wherein a curvature profile of the original shape of the back surface is to be preserved within the boundary line;
c) determining a boundary curvature of the back surface at the boundary line;
d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value; and,
e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank; and,
wherein the original lens shape provides for a negative focal power, wherein the predefined curvature value is a predetermined lower threshold curvature value, and wherein, as the thickness requirement, a sagittal height of the preserved curvature profile of the original lens shape of the back surface within the boundary line is fixed, and wherein a minimum thickness of the outer edge is applied as a mandatory boundary condition during the optimization process; and,
f) manufacturing the uncut lens blank according to the modified lens shape.

8. The method according to claim 1, wherein the method further comprises defining a transition zone adjacent to the boundary line towards the outer edge in which transition zone the curvature transitions monotonically from the boundary curvature to the predefined curvature value towards the outer edge of the uncut lens blank, and wherein the transition zone is set to have a length which should not be less than a predetermined minimum length.

9. The method according to claim 1, wherein the method further comprises defining a transition zone adjacent to the boundary line towards the outer edge of the uncut lens blank in which transition zone the curvature transitions monotonically from the boundary curvature to the predefined curvature value towards the outer edge, and wherein the transition zone is set by defining a maximum magnitude for a gradient of the curvature.

10. A computer-implemented method for providing a modified lens shape for an uncut lens blank comprising the following steps:
a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;
b) determining a boundary line on the back surface, wherein a curvature profile of the original shape of the back surface is to be preserved within the boundary line;
c) determining a boundary curvature of the back surface at the boundary line;
d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value; and,
e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank; and,
wherein a shape of a frame into which a final lens is to be inserted is provided, wherein a frame line is defined by a line along which the uncut lens blank is to be cut to fit into the frame, and wherein a shape of the boundary line corresponds to a shape of the frame line; and,
f) manufacturing the uncut lens blank according to the modified lens shape.

11. A computer-implemented method for reducing a thickness of an original lens shape of an uncut lens blank, comprising the following steps:
  A) providing an original lens shape of an uncut lens blank, wherein the original lens shape comprises an original shape of a front surface and a back surface of the uncut lens blank wherein the uncut lens blank has predetermined optical properties;
  B) specifying a set of parameters including a recommended maximum magnitude of a curvature gradient of the back surface, a hard-limit maximum magnitude of a curvature gradient of the back surface which is larger than the recommended maximum magnitude, a recommended predefined curvature value, a minimum value for an eye rotation angle, a recommended value for the eye rotation angle, a frame line on the back surface along which a final lens is to be cut out of the uncut lens blank, a maximum lens thickness along the frame line, and a boundary line within which the original shape of the back surface is to be preserved;
  C) iteratively conducting a method for providing a modified lens shape based on the set of parameters to provide for a modified lens shape until a lens thickness along the frame line of the modified lens shape is equal to or below the specified maximum lens thickness, and wherein, during iteration, at least one of the maximum magnitude curvature gradient of the back surface, the boundary line and the predefined curvature value is modified, the method comprising the following steps:
    a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;
    b) determining a boundary line on the back surface, wherein a curvature profile of the original shape of the back surface is to be preserved within the boundary line;
    c) determining a boundary curvature of the back surface at the boundary line;
    d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value; and,
    e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank; and,
    f) manufacturing the uncut lens blank according to the modified lens shape.

12. The method according to claim 11, wherein, during the iteration in step C), the set of parameters is modified according to the following sequence:
  I. applying the recommended maximum magnitude of the curvature gradient and the recommended predefined curvature value, and decreasing the boundary line from an initial shape being at least partly identical to the frame line towards a shape enclosing a back surface area covering at least the recommended eye rotation angle;
  II. increasing the magnitude of the maximum curvature gradient from the recommended maximum magnitude towards the hard-limit maximum magnitude; and,
  III. decreasing the boundary line from a shape enclosing the back surface area covering at least the recommended eye rotation angle towards a shape enclosing a back surface area covering at least the minimum eye rotation angle.

13. The method according to claim 12, wherein step C) further comprises specifying a hard-limit predefined curvature value which has a larger magnitude than the recommended predefined curvature value, and wherein, subsequent to said sequence step III., the hard-limit predefined curvature value is applied as the predefined curvature value during optimization.

14. A method for manufacturing a lens, comprising the following steps:
  a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;
  b) determining a boundary line on the back surface, wherein a curvature profile of the original shape of the back surface is to be preserved within the boundary line;
  c) determining a boundary curvature of the back surface at the boundary line;
  d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value;
  e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank; and,
  f) manufacturing the uncut lens blank according to the modified lens shape.

15. A non-transitory computer program product comprising program code means for carrying out the steps of a method for providing a modified lens shape for an uncut lens blank comprising the following steps:
  a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;

b) determining a boundary line on the back surface, wherein a curvature profile of the original shape of the back surface is to be preserved within the boundary line;

c) determining a boundary curvature of the back surface at the boundary line;

d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value; and, e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank; and, f) manufacturing the uncut lens blank according to the modified lens shape.

16. A machine readable storage medium having stored thereon a computer program comprising program code means for carrying out the steps of a method for providing a modified lens shape for an uncut lens blank comprising the following steps:

a) providing an original lens shape of an uncut lens blank having a front surface and a back surface, wherein the original lens shape comprises an original shape of the front surface and an original shape of the back surface of the uncut lens blank, wherein the uncut lens blank has predetermined optical properties;

b) determining a boundary line on the back surface, wherein a curvature profile of the original shape of the back surface is to be preserved within the boundary line;

c) determining a boundary curvature of the back surface at the boundary line;

d) determining a new curvature profile of the back surface between the boundary line and an outer edge of the uncut lens blank, wherein a curvature of the new curvature profile at the boundary line equals the boundary curvature and transitions monotonically and continuously towards the outer edge from the boundary curvature towards a predefined curvature value; and, e) determining a modified lens shape of the uncut lens blank, wherein the modified lens shape comprises the original shape of the front surface, and a modified shape of the back surface, wherein the modified shape of the back surface is determined by an optimization procedure based on the new curvature profile towards a target shape, and wherein the target shape includes the preserved curvature profile of the original lens shape within the boundary line and a thickness requirement for the outer edge of the uncut lens blank; and, f) manufacturing the uncut lens blank according to the modified lens shape.

\* \* \* \* \*